United States Patent
Tabata et al.

(10) Patent No.: US 7,502,679 B2
(45) Date of Patent: Mar. 10, 2009

(54) DECELERATION CONTROL APPARATUS AND METHOD FOR A VEHICLE

(75) Inventors: Atsushi Tabata, Okazaki (JP); Kazutoshi Nozaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 469 days.

(21) Appl. No.: 11/229,732

(22) Filed: Sep. 20, 2005

(65) Prior Publication Data

US 2006/0060399 A1    Mar. 23, 2006

(30) Foreign Application Priority Data

Sep. 21, 2004    (JP)    ............... 2004-274145

(51) Int. Cl.
*B60K 6/20* (2007.10)
(52) U.S. Cl. ................ 701/70; 701/93; 180/65.2
(58) Field of Classification Search ............... None
See application file for complete search history.

(56) References Cited

U.S. PATENT DOCUMENTS

| | | | |
|---|---|---|---|
| 5,315,900 A | * | 5/1994 | Teeter .................. 477/165 |
| 6,223,118 B1 | * | 4/2001 | Kobayashi et al. ............ 701/96 |
| 6,621,176 B1 | * | 9/2003 | Nagasaka et al. ............ 307/9.1 |
| 6,964,461 B2 | * | 11/2005 | Yokoyama et al. ........... 303/155 |
| 7,216,943 B2 | * | 5/2007 | Nishikawa et al. ........... 303/152 |
| 2001/0014845 A1 | * | 8/2001 | Minowa et al. ................ 701/84 |

FOREIGN PATENT DOCUMENTS

| | | |
|---|---|---|
| DE | 196 40 694 A1 | 4/1998 |
| DE | 198 41 838 A1 | 3/2000 |
| JP | 10153254 A | 6/1998 |
| JP | 10159961 A | 6/1998 |
| JP | 2000245016 A | 9/2000 |
| JP | 2004-182149 A | 7/2004 |
| WO | WO 02/08035 A1 | 1/2002 |

\* cited by examiner

*Primary Examiner*—Michael J. Zanelli
(74) *Attorney, Agent, or Firm*—Kenyon & Kenyon LLP

(57) ABSTRACT

A target deceleration of a vehicle is increased or decreased under given conditions and braking force is controlled in accordance with the increased or decreased target deceleration. Upon the increase or decrease in the target deceleration, the rate of change in the target deceleration is variably set.

19 Claims, 22 Drawing Sheets

FIG. 1B

| | C1 | C2 | C3 | C4 | B1 | B2 | SPEED RATIO |
|---|---|---|---|---|---|---|---|
| P | | | | | | | |
| Rev1 | | | ○ | | | ○ | 4.022 |
| Rev2 | | | | ○ | | ○ | 2.158 |
| N | | | | | | | |
| 1st | ○ | | | | | ○ | 4.495 |
| 2nd | ○ | | | | ○ | | 2.697 |
| 3rd | ○ | | ○ | | | | 1.864 |
| 4th | ○ | | | ○ | | | 1.471 |
| 5th | ○ | ○ | | | | | 1.238 |
| 6th | | ○ | | ○ | | | 1.000 |
| 7th | | ○ | ○ | | | | 0.823 |
| 8th | | ○ | | | ○ | | 0.683 |

($\rho 1=0.463$  $\rho 2=0.463$  $\rho 3=0.415$)

FIG. 5

| OPERATING MODE | Ci | ENG | MG1 | MG2 |
|---|---|---|---|---|
| ENGINE RUNNING MODE | ○ | ○ | (REGENERATING) | × |
| ENGINE + MOTOR RUNNING MODE | ○ | ○ | × | POWERING |
| MOTOR RUNNING MODE | × | △ | (REGENERATING) | POWERING |
| DECELERATION CONTROL MODE | ○ | × | (POWERING/REGENERATING) | POWERING/REGENERATING |

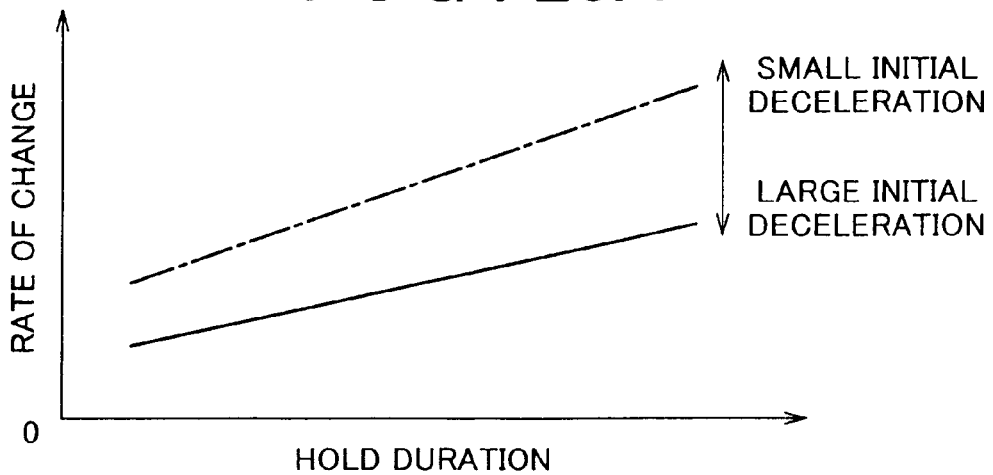
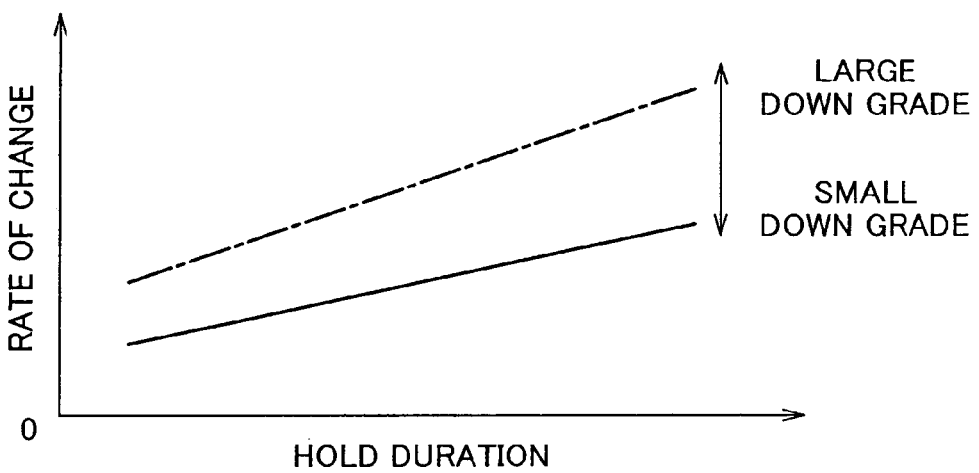
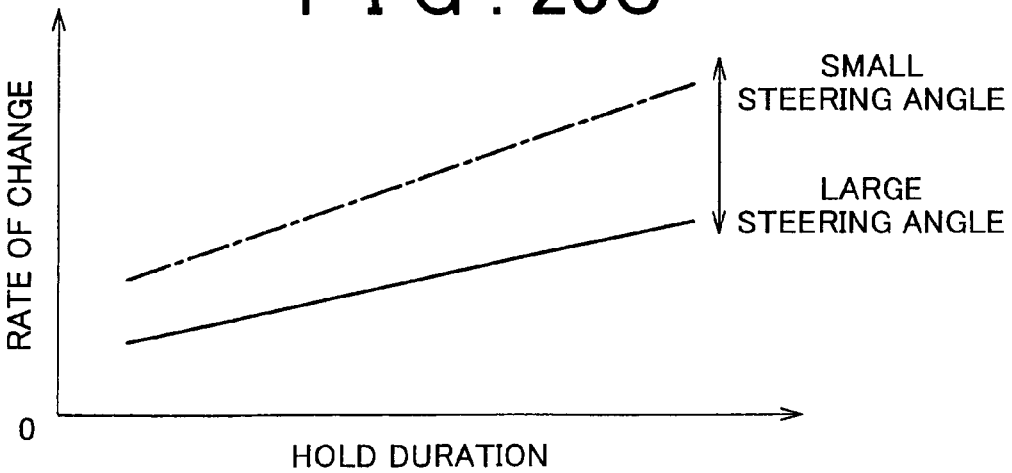

DECELERATION CONTROL APPARATUS AND METHOD FOR A VEHICLE

INCORPORATION BY REFERENCE

The disclosure of Japanese Patent Application No. 2004-274145 filed on Sep. 21, 2004 including the specification, drawings and abstract is incorporated herein by reference in its entirety.

BACKGROUND OF THE INVENTION

1. Field of the Invention

The invention relates to deceleration control apparatus and method for a vehicle, and more particularly, to deceleration control apparatus and method that enable increases and decreases in a target deceleration to be set appropriately.

2. Description of the Related Art

A deceleration control apparatus for a vehicle has been proposed which has target deceleration controlling means for increasing and decreasing a target deceleration, and which controls a braking force in accordance with the target deceleration set by that target deceleration controlling means. The apparatus disclosed in JP(A) 2000-245016 is one example of such a deceleration control apparatus. This apparatus is provided with an E position for a shift lever. By shifting the shift lever to a Decel side (i.e., a side which promotes deceleration) or a Can-Decel side (i.e., a side which suppresses deceleration) in this E position, a target deceleration is either increased or decreased while shift control in the automatic transmission, as well as powering torque or regenerative torque control in an electric motor, is performed to generate a predetermined braking force in accordance with that target deceleration.

Conventional deceleration control apparatuses, however, uniformly set the rate of change in the target deceleration with respect to an operation of the shift lever (i.e., target deceleration setting means) such that, for example, when the shift lever is shifted once to the Decel side, the target deceleration increases only a certain amount. Therefore, when the rate of change is slow, such as when the amount of change is small, the operation time for setting the target deceleration increases. On the other hand, when the rate of change is fast, it is difficult to set the desired target deceleration and the target deceleration may become too large. Thus, there is still room for improvement with respect to setting increases and decreases in the target deceleration.

SUMMARY OF THE INVENTION

In view of the foregoing circumstances, this invention aims to enable an increase/decrease in a target deceleration to be set appropriately, e.g., enable a desired target deceleration to be set quickly by an easy target deceleration setting operation.

Therefore, a first aspect of the invention relates to a deceleration control apparatus for a vehicle, which includes target deceleration controlling means for increasing/decreasing a target deceleration and which controls a braking force in accordance with the target deceleration set by the target deceleration controlling means, wherein a rate of change in the target deceleration is variably set.

Because the rate of change in the target deceleration is variably set, it is possible to easily set a desired target deceleration and prevent the target deceleration from becoming too large when the rate of change is slow, for example, and quickly set the target deceleration, even when it is relatively large, when the rate of change is fast. As a result, highly responsive deceleration control can be performed so the increase/decrease of that deceleration can be set appropriately.

In the foregoing deceleration control apparatus, the target deceleration controlling means may increase/decrease the target deceleration in response to an operation of target deceleration setting means by a driver. Further, the target deceleration may gradually change during operation of the target deceleration setting means and the rate of that change may become faster as the duration of the operation of the target deceleration setting means becomes longer.

In this case, the target deceleration gradually changes while the target deceleration setting means is being operated and the rate of that change increases the longer the duration of that operation. As a result, even if the change in the target deceleration is large, the target deceleration can be set quickly by continuing the operation, thereby improving the responsiveness of the deceleration control. Meanwhile, the rate of change is slow when the duration of the operation is short so a desired target deceleration can be set both easily and with high accuracy.

In the foregoing deceleration control apparatus, the rate of change in the target deceleration may change depending on a running state of the vehicle.

Also in the foregoing deceleration control apparatus, the running state of the vehicle may be initial deceleration when the target deceleration changes, vehicle speed, steering angle, or road gradient.

In this case, the rate of change in the target deceleration is variably set according to a running state of the vehicle. Therefore the target deceleration can be increased or decreased easily and appropriately depending on the running state by, for example, making the rate of change slow with a running state in which deceleration control according to a comparatively accurate target deceleration is desired, such as when the initial deceleration is large, when the steering angle is large, or when the vehicle is running at a high speed, and making the rate of change fast with a running state in which a comparatively rapid deceleration control is desired, such as when the initial deceleration is small or when the vehicle is traveling down a steep down grade, for example.

In the foregoing deceleration control apparatus, the target deceleration may be limited by an upper limit guard value and the upper limit guard value may be variably set.

A second aspect of the invention relates to a deceleration control apparatus for a vehicle, which includes target deceleration controlling means for increasing/decreasing a target deceleration and which controls a braking force in accordance with the target deceleration set by the target deceleration controlling means, wherein the target deceleration is limited by an upper limit guard value and the upper limit guard value is variably set.

In the deceleration control apparatus based on the foregoing first and second aspects of the invention, the upper limit guard value may change depending on the steering angle.

As described above, limiting the target deceleration by an upper limit guard value prevents sudden deceleration due to a large braking force suddenly being generated due to the target deceleration becoming too large, as it may when the rate of change at the time the target deceleration is increased is fast. As a result, it is easy to increase the target deceleration. In addition, it is also possible to quickly set an increase when setting the target deceleration (upper limit guard value) as large as possible. Also, because the upper limit guard value is variably set, the deceleration control can be performed appropriately using the largest target deceleration possible for that running state and the like, without limiting the target deceleration more than necessary, by setting the upper limit guard value appropriately for the running state such as the steering angle.

The deceleration control apparatus for a vehicle according to the invention is preferably applied to a vehicle having an engine and an electric motor which are both provided such that power can be transmitted between them and driven wheels of a vehicle. The invention is not limited to this, however, but can also be applied to a variety of vehicles, such as one in which only the engine or only the electric motor is provided such that power can be transmitted between it and driven wheels of a vehicle. The electric motor is an electric motor which converts electrical energy into rotational motion, a generator that converts rotational motion into electrical energy, or a motor/generator that can both convert electrical energy into rotational motion and convert rotational motion into electrical energy.

The invention can be applied to a variety of vehicles, such as engine driven vehicles which use only an engine as the power source, electric vehicles which use only an electric motor as the power source, hybrid vehicles which use both an engine and an electric motor as power sources, vehicles provided with a prime mover other than an engine or an electric motor as the power source, and vehicles provided with three or more prime movers. Hybrid vehicles include parallel hybrid vehicles in which power from the engine is able to be transmitted directly to the driven wheels, and series hybrid vehicles in which power from the engine is used only to generate electricity and not directly transmitted to the driven wheels.

This invention includes brake controlling means for controlling braking force according to a target deceleration set by target deceleration controlling means, for example. This brake controlling means controls the engine braking force by changing the speed ratio of an automatic transmission provided in a power transmission path between the engine and the driven wheels, as well as generates a predetermined braking force by controlling the torque of an electric motor, for example. The torque of the electric motor is controlled so as to generate a predetermined braking force by either increasing the braking force generated by regenerative braking torque and powering torque in the reverse rotational direction, or reducing the braking force generated by powering torque in the forward rotational direction. Aside from using this kind of power source brake, braking force can also be controlled using another braking device such as a wheel brake provided on a vehicle wheel. The automatic transmission is not limited to being a stepped transmission such as a planetary gear type transmission or a counter shaft type transmission, but may be a continuously variable transmission such as a belt type or toroidal type continuously variable transmission. Various modes are possible depending on the type of engine. For example, it is also possible to control the engine braking force by controlling, for example, the opening and closing timing and the lift amount of the intake and exhaust valves, or the opening amount of the throttle valve.

When braking force is controlled using both shift control of a stepped transmission and torque control of an electric motor, the amount of change when the target deceleration is changed in a stepped fashion by target deceleration controlling means in response to an operation of target deceleration setting means is less than the amount of change in the deceleration achieved by a shift of the stepped transmission. The braking force is therefore able to be finely controlled by combining the torque control of the electric motor and shift control of the transmission, which is highly desirable. The amount of change on the increase side of the target deceleration and the amount of change on the decrease side of the target deceleration set to increase or decrease by the target deceleration controlling means may either be set equal to each other or different from each other.

The brake controlling means for controlling the braking force according to the target deceleration is structured so as to obtain the braking force necessary to achieve the target deceleration from, for example, a preset data map and an operational equation, and generate that necessary braking force by a power source brake and the like. Because the necessary braking force changes depending on the operating conditions, such as the road gradient and the vehicle weight (the number of occupants, etc.), however, it is desirable to obtain the necessary braking force using the operating conditions as parameters. It is also possible to detect the deceleration and perform feedback control of the braking force so as to achieve the target deceleration.

The target deceleration setting means can be disposed in any one of various locations near the driver's seat, such as a predetermined operating position of the shift lever, on the steering wheel, on the steering column, or on the instrument panel. The target deceleration setting means may be structured so as to include, for example, first target deceleration setting means for instructing an increase or decrease in response to a shift lever operation and a second target deceleration setting means which is provided separately from the shift lever on or near the steering wheel. The shift lever may be provided on the steering column or on a center console portion beside the driver's seat. When the second target deceleration setting means is provided on or near the steering wheel, however, the shift lever is preferably arranged on the center console portion beside the driver's seat.

Various modes of the target deceleration setting means are possible, such as an automatic return switch which automatically returns to its original position, a push-button, or a lever. One of the target deceleration setting means is, for example, of a pair of switches, e.g., a Decel switch for increasing the target deceleration and a Can-Decel switch for reducing the target deceleration.

The target deceleration controlling means is structured so as to increase or decrease the target deceleration in one step increments every time the target deceleration setting means is turned on once, for example. Alternatively, however, the target deceleration controlling means may be structured so as to change the target deceleration either continuously for two or more steps or in jumps in increments of two or more steps depending on the duration for which the target deceleration setting means is turned on. The target deceleration controlling means may also be structured to increase or decrease the target deceleration continuously for the duration for which the target deceleration setting means is turned on.

The deceleration control mode may be established by only operation of the target deceleration setting means and performed according to the target deceleration. Alternatively, however, deceleration control mode selecting means (such as an on-off switch) for turning the deceleration control mode on (i.e., executing the deceleration control mode) and off (i.e., canceling the deceleration control mode) may also be provided separately from the target deceleration setting means. A deceleration control mode select position can by provided as an operating position of the shift lever and the deceleration control mode can be established by shifting the shift lever into that deceleration control mode select position. Further, the Decel switch and the Can-Decel switch can be provided at that deceleration control mode select position and the target deceleration can be increased or decreased by a shift lever operation.

An operation of the target deceleration setting means can be made effective by establishing the deceleration control mode only when the deceleration control mode has been selected by, for example, shifting the shift lever into the deceleration control mode select position or turning on the deceleration control mode select switch. Even if the deceleration control mode is not selected, the deceleration control may be started with the deceleration control mode as it is when there is an operation to increase the target deceleration using the target deceleration setting means provided on the steering wheel, for example, thus making it easy to operate the deceleration control.

The variable setting of the rate of change in the target deceleration may also be applied only to a case in which the target deceleration is increased, and the target deceleration may be changed at a fixed rate of change when it is decreased. Alternatively, however, the rate of change for both an increase and a decrease may be variably set. The variable setting of the rate of change is such that when the target deceleration is continuously changed (e.g., increased) when the target deceleration setting means is turned on, for example, that rate of change may be changed either continuously or in a stepped fashion. Further, when the target deceleration is changed in a stepped fashion according to the operation time, that change width need simply be changed (e.g., increased) or the change time need simply be changed (e.g., shortened). When the target deceleration is increased or decreased in one step increments every time that the target deceleration setting means is turned on once, the rate of change can be changed by increasing or decreasing the amount of that change.

The rate of change in the target deceleration is variably set with, for example, the duration of the operation, the vehicle speed, the steering angle, the initial deceleration, the down grade, the road conditions, etc., as the parameters. It is desirable to make the rate of change faster either continuously or in a stepped fashion so that a large target deceleration can be set quickly the longer the duration of the operation, the slower the vehicle speed, the smaller the steering angle, the smaller the initial deceleration, or the steeper the down grade. When the vehicle speed is fast, the steering angle is large, or the coefficient of friction $\mu$ of the road surface is low (such as on a snowy or icy road), a sudden or large change in the deceleration is not desirable, and when the initial deceleration is already large, the amount of change until the upper limit of the target deceleration is small so in either case a slow rate of change in the target deceleration is preferable. The structure may also be such that the rate of change in the target deceleration can be changed appropriately by a manual operation by the driver.

With auto-cruise control in which the vehicle is run automatically without the need for an accelerator operation or a brake operation, it is preferable to make the rate of change in the target deceleration faster the shorter the distance to a preceding vehicle so that the vehicle can be decelerated quickly. In this case, the target deceleration setting means that is operated by the driver is not always necessary.

The upper limit guard value of the target deceleration is variably set using, for example, the steering angle, the road condition, or the like as a parameter. When the steering angle is large or the coefficient of friction $\mu$ of the road surface is low (such as on a snowy or icy road), sudden deceleration by a large braking force is not desirable, so the upper limit guard value is preferably set low. The upper limit guard value may also be variably set using a running state other than the vehicle speed and the like as a parameter.

The upper limit guard value of the target deceleration is particularly effective when increasing the target deceleration in response to a manual operation of the target deceleration setting means performed by the driver. However, providing an upper limit guard value also makes it easier to control an increase in the target deceleration when the target deceleration is increased automatically by auto-cruise control or the like.

A third aspect of the invention relates to a deceleration control method for a vehicle including setting a target deceleration, controlling a braking force in accordance with the target deceleration, and changing the target deceleration. In this method, a rate of change in the target deceleration is variably set.

In the foregoing method, the change of the target deceleration may be triggered by an operation of a driver, and the variable setting of the rate of change in the target deceleration may be performed based on the operation of the driver.

Also, the change of the target deceleration may be such that the target deceleration gradually changes during the operation of the driver, and the variable setting of the rate of change in the target deceleration may be such that the rate of change in the target deceleration becomes faster as duration of the operation of the driver becomes longer.

Also, the variable setting of the rate of change in the target deceleration may be performed based on a running state of the vehicle.

Also, the running state of the vehicle may include at least one of initial deceleration when the target deceleration changes, vehicle speed, steering angle, and road gradient.

Also, the target deceleration may be limited by an upper limit guard value and the upper limit guard value may be variably set.

Also, the upper limit guard value may change depending on steering angle.

A fourth aspect of the invention relates to a deceleration control method for a vehicle including setting an upper limit guard value and setting a target deceleration of a vehicle so as to be equal to, or less than, the upper limit guard value. In this method, too, the upper limit value is variably set. For example, the upper limit guard value may change depending on steering angle.

A fifth aspect of the invention relates to a deceleration control apparatus for a vehicle, including a power train including at least one power source for running the vehicle and a deceleration controller for setting a target deceleration of the vehicle and controlling at least braking force generated by the power train so as to achieve the target deceleration. The deceleration controller is adapted to variably set a rate of change in the target deceleration.

The foregoing deceleration control apparatus may further include a target deceleration setting portion that is operated by a driver to adjust the target deceleration and the deceleration controller may be adapted to change the rate of change in the target deceleration in accordance with the operation of the target deceleration setting portion by the driver.

Also, the deceleration may be adapted to change the target deceleration gradually during the operation of the target deceleration setting means.

Also, the deceleration controller may be adapted to make the rate of change in the target deceleration faster as duration of the operation of the target deceleration setting means becomes longer.

Also, the foregoing deceleration control apparatus may further include a running state detector for detecting a running state of the vehicle, and the deceleration controller may be adapted to change the rate of change in the target deceleration based on the running state of the vehicle detected by the running state detector. For example, the running state detector may include at least one of a vehicle speed detector for detecting vehicle speed, a steering angle detector for detecting steering angle, a road gradient detector for detecting road gradient, and an initial deceleration detector for detecting initial deceleration when the target deceleration changes.

Also, the deceleration controller may be adapted to limit the target deceleration by an upper limit guard and set the upper limit guard variably. For example, the upper limit guard may be changed depending on steering angle.

Also, the at least one power source may include a first power source that generates first torque and a second power source that generates second torque, and the deceleration controller may be adapted to obtain a sum of the first torque and the second torque and control the braking force according to the obtained sum. For example, the first power source may be an internal combustion engine that generates engine brake torque as the first torque, and the second power source may be a motor-generator that generates powering torque in a driving mode and generates regenerating torque in a regenerating mode, at least one of which being the second torque.

According to the foregoing deceleration control methods of the third to fourth aspects of the invention and the foregoing deceleration control apparatus of the fifth aspect of the invention, it is possible to obtain substantially the same advantages as described in conjunction with the first and second aspects of the invention.

BRIEF DESCRIPTION OF THE DRAWINGS

FIG. 5 is a graph showing an example of possible operating modes by the vehicle drive system in FIG. 1;

FIG. 20A-C are views of another exemplary embodiment of the invention, and show examples of data maps when the rate of change in the target deceleration is changed based on the initial deceleration, the down grade, and the steering angle, respectively;

DETAILED DESCRIPTION OF THE PREFERRED EMBODIMENTS

Figure 1A:
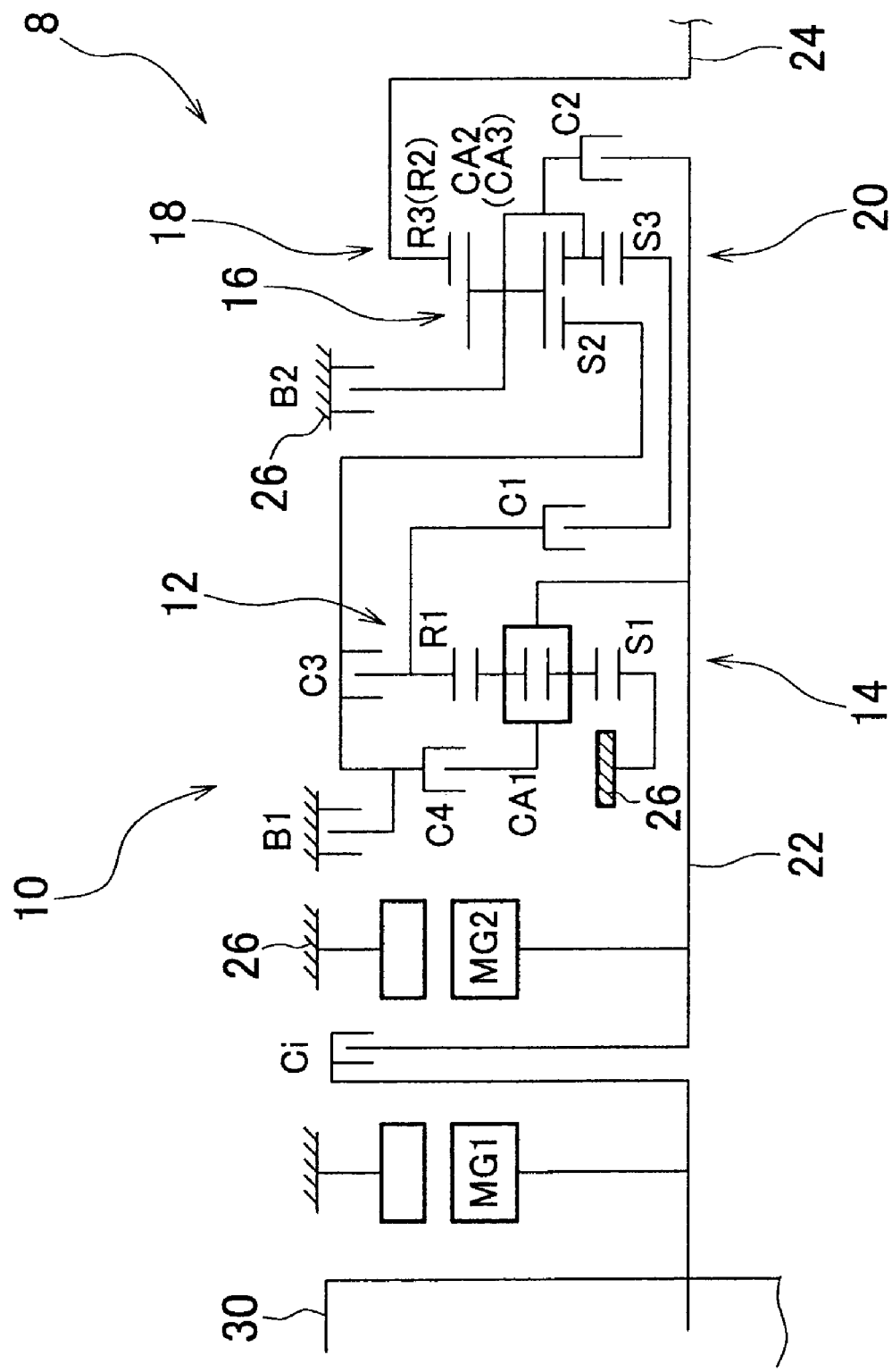
FIG. 1 is a view of an example of a vehicle drive system to which the invention can be applied, with FIG. 1A being a skeleton graph and FIG. 1B being a clutch and brake application chart showing various application and release combinations of clutches and brakes to achieve a plurality of speeds.

Hereinafter, exemplary embodiments of the invention will be described in detail with reference to the accompanying drawings. FIG. 1A is a skeleton graph of a drive system 8 for a hybrid vehicle to which the invention is applied. FIG. 1B is a clutch and brake application chart showing various application and release combinations of clutches and brakes to achieve a plurality of speeds in an automatic transmission 10 provided in the drive system 8. The vehicle drive system 8 includes an engine 30 which generates power by burning fuel, a first electric motor MG1, a second electric motor MG2, and an automatic transmission 10, all arranged along the same axis in that order. This vehicle drive system 8 is preferably used in an FR vehicle in which the engine is longitudinal mounted (i.e., mounted in the longitudinal direction of the vehicle). The engine 30 and the second electric motor MG2 are mainly used as the power sources for running, while the first electric motor MG1 is mainly used to start the engine and generate power. Further, the first electric motor MG1 is connected to the engine 30 via a damper, not shown. A clutch Ci is provided between the first electric motor MG1 and the second electric motor MG2 so that the transmission of power between the engine 30 and the first electric motor MG1 and the second electric motor MG2 can be interrupted. The electric motors MG1 and MG2 and the automatic transmission 10 are all generally symmetrical with respect to a center axis so their lower halves below the center axis are omitted in FIG. 1A.

The automatic transmission 10 includes a first transmitting portion 14 and a second transmitting portion 20, both of which lie on the same axis. The first transmitting portion 14 mainly includes a double pinion type first planetary gear set 12. The second transmitting portion 20 mainly includes a single pinion type second planetary gear set 16 and a double pinion type third planetary gear set 18. The automatic transmission 10 takes the rotation from an input shaft 22, changes it, and then outputs that changed rotation to an output shaft 24. The input shaft 22 corresponds to an input member and is integrally connected to a rotor of the second electric motor MG2. The output shaft 24 corresponds to an output member and rotatably drives left and right driven wheels via a propeller shaft and a differential gear unit.

Figure 2:
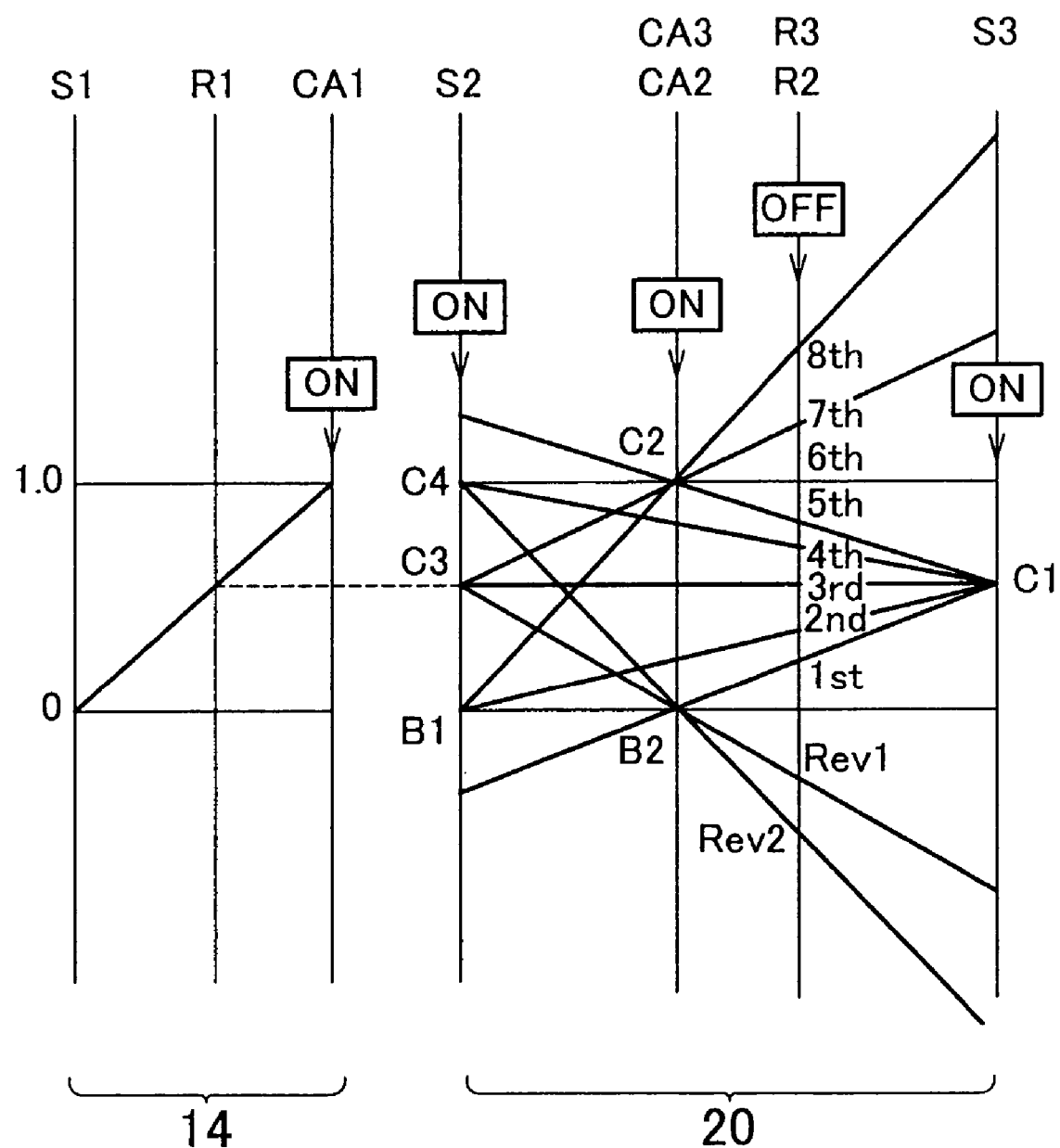
FIG. 2 is an alignment graph of an automatic transmission shown in FIG. 1.

FIG. 2 is an alignment graph which can indicate with straight lines the rotation speed of various rotating elements (i.e., sun gears S1 to S3, carriers CA1 to CA3, and ring gears R1 to R3) of the first transmitting portion 14 and the second transmitting portion 20 of the automatic transmission 10. The lower horizontal line in the graph represents a rotation speed of "0", while the upper horizontal line represents a rotation speed of "1.0", i.e., the same rotation speed as the input shaft 22. Eight forward speeds, i.e., first forward speed "1st" to eighth forward speed "8th", as well as two reverse speeds, i.e., first reverse speed "Rev1" and second reverse speed "Rev2", can be achieved depending on the operating state (i.e., application or release) of clutches C1 to C4 and brakes B1 and B2. The clutch and brake application chart in FIG. 1B shows the relationships between each speed and the operating states of the clutches C1 to C4 and the brakes B1 and B2. A circle represents application. The speed ratio of each speed is set appropriately according to each gear ratio $\rho 1$, $\rho 2$, and $\rho 3$ (=the number of teeth on the sun gear divided by the number of teeth on the ring gear) of the first planetary gear set 12, the second planetary gear set 16, and the third planetary gear set 18. The speed ratios shown in FIG. 1B are when $\rho 1=0.463$, $\rho 2=0.463$, and $\rho 3=0.415$. Reference numeral 26 in FIG. 1A denotes a transmission case.

Figure 3:
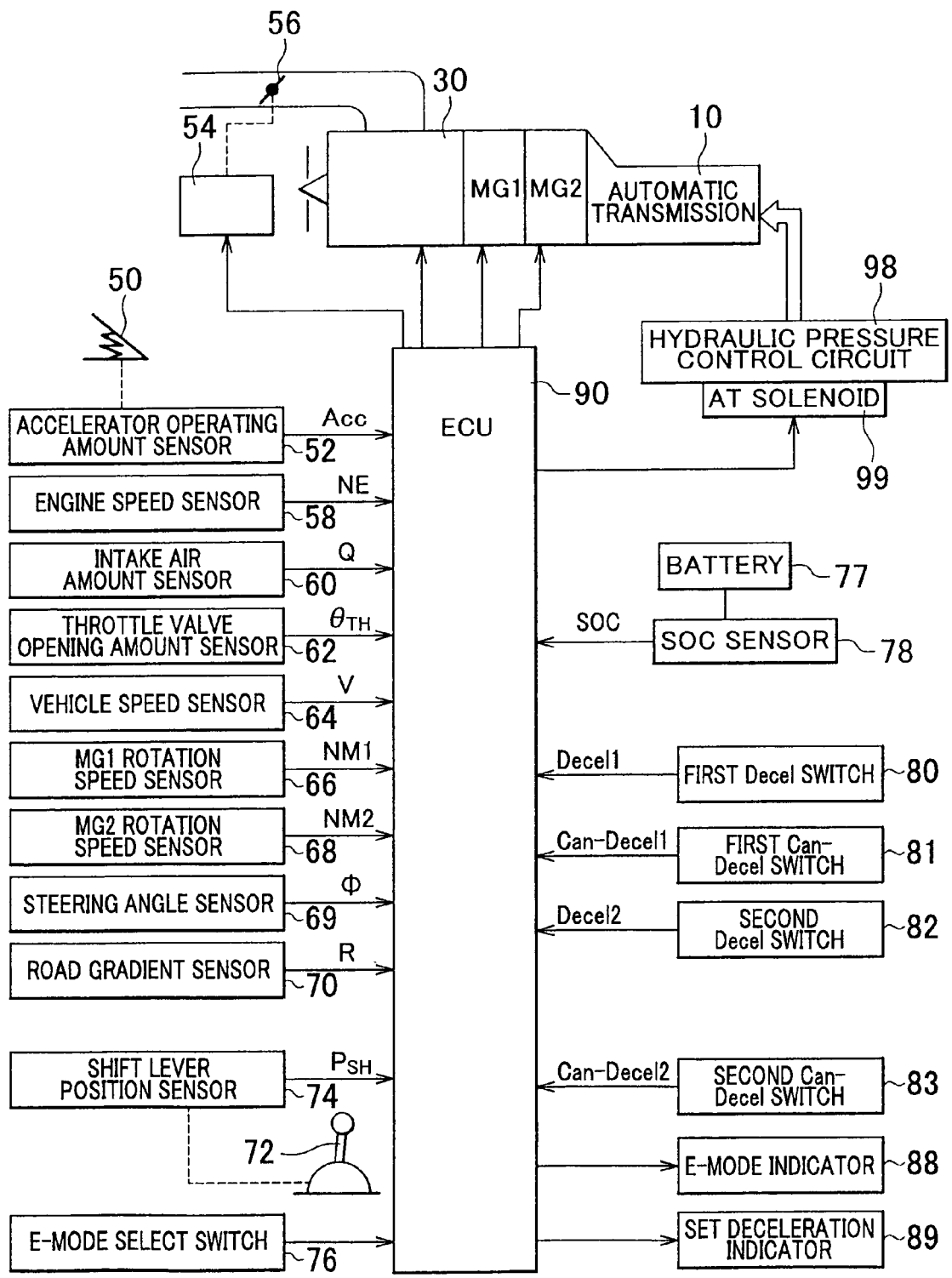
FIG. 3 is a block line graph showing the main portions of a control system provided in the vehicle drive system shown in FIG. 1.

FIG. 3 is a block line diagram schematically showing a control system provided in the vehicle for controlling the automatic transmission 10, the engine 30, the electric motors MG1 and MG2 and the like. An operating amount Acc of an accelerator pedal 50 is detected by an accelerator operating amount sensor 52. The accelerator pedal 50 is operated by being depressed in accordance with an output request amount by a driver, and corresponds to an accelerator operating member. The accelerator operating amount Acc corresponds to the output request amount. An electronic throttle valve 56, the opening angle (opening amount) $\theta TH$ of which is controlled by a throttle actuator 54, is provided in an intake pipe of the engine 30. Also provided are an engine speed sensor 58 for detecting a rotation speed NE of the engine 30, an intake air amount sensor 60 for detecting an intake air quantity Q of the engine 30, a throttle valve opening amount sensor 62 with an idle switch for detecting when the electronic throttle valve 56 is fully closed (i.e., when the engine is in an idle state) as well as detecting the opening amount $\theta TH$ of the electronic throttle valve 56, a vehicle speed sensor 64 for detecting a vehicle speed V (corresponding to a rotation speed Nout of the output shaft 24), a MG1 rotation speed sensor 66 for detecting a rotation speed NM1 of the first electric motor MG1, and a MG2 rotation speed sensor 68 for detecting a rotation speed NM2 (=a rotation speed Nin of the input shaft 22) of the second electric motor MG2. Also provided are a steering angle sensor 69 for detecting a steering angle $\phi$ of a steering wheel, a road gradient sensor 70 for detecting a road gradient R, a shift lever position sensor 74 for detecting an operating position PSH of a shift lever 72, an E-mode select switch 76 which is turned on by the driver when a deceleration control mode is selected, a SOC sensor 78 for detecting a state-of-charge SOC of a battery 77 connected to the electric motors MG1 and MG2, a first Decel switch 80, a first Can-Decel switch 81, a second Decel switch 82, and a second Can-Decel switch 83, and the like. These various sensors and switches output signals to an electronic control unit (ECU) 90, which are indicative of the engine speed NE, the intake air quantity Q, the throttle valve opening amount $\theta TH$, the vehicle speed V, the first motor rotation speed NM1, the second motor rotation speed NM2, the steering angle $\phi$, the road gradient R, the operating position PSH of the shift lever 72, whether the E-mode select switch 76 is on or off, the state-of-charge SOC, a first Decel command Decel1, a first Can-Decel command Can-Decel1, a second Decel command Decel2, a second Can-Decel command Can-Decel2, and the like.

The electronic control unit 90 includes a so-called microcomputer which has a CPU, RAM, ROM, an input/output interface, and the like. The CPU runs the vehicle in a plurality of operating modes, in which the engine 30 and the electric motors MG1 and MG2 are in different operating states, by controlling the output of the engine 30, the shifting of the automatic transmission 10, the powering/regeneration by the electric motors MG1 and MG2 and the like by performing signal processing according to a program stored beforehand in the ROM using the temporary memory function of the RAM. FIG. 5 shows an example of the operating modes. In an engine running mode, the clutch Ci is applied to connect the engine 30 and the vehicle is run by driving force generated by the engine 30. When not all of the power generated by the engine is being used to drive the vehicle, for example, the first electric motor MG1 can be controlled to regenerate that power as necessary and use it to charge the battery 77. In an engine plus motor running mode, the clutch Ci is applied to connect the engine 30, and the vehicle is run by the driving force generated by both the engine 30 and the second electric motor MG2. In a motor running mode, the clutch Ci is released to disconnect the engine 30, and the vehicle is run by the driving force generated by the second electric motor MG2. When the state-of-charge SOC of the battery 77 is low, for example, the engine 30 is operated as necessary and the first electric motor MG1 is controlled to regenerate power from the engine 30 and charge the battery 77. In a deceleration control mode, the clutch Ci is applied to connect the engine 30 and the supply of fuel to the engine 30 is stopped by a fuel cut to induce engine braking, while the second electric motor MG2 is controlled to either produce or regenerate power, thereby generating a predetermined power source brake. The first electric motor MG1 can also be used to adjust the power source brake by also being controlled to either produce or regenerate power, just like the second electric motor MG2.

Figure 6:
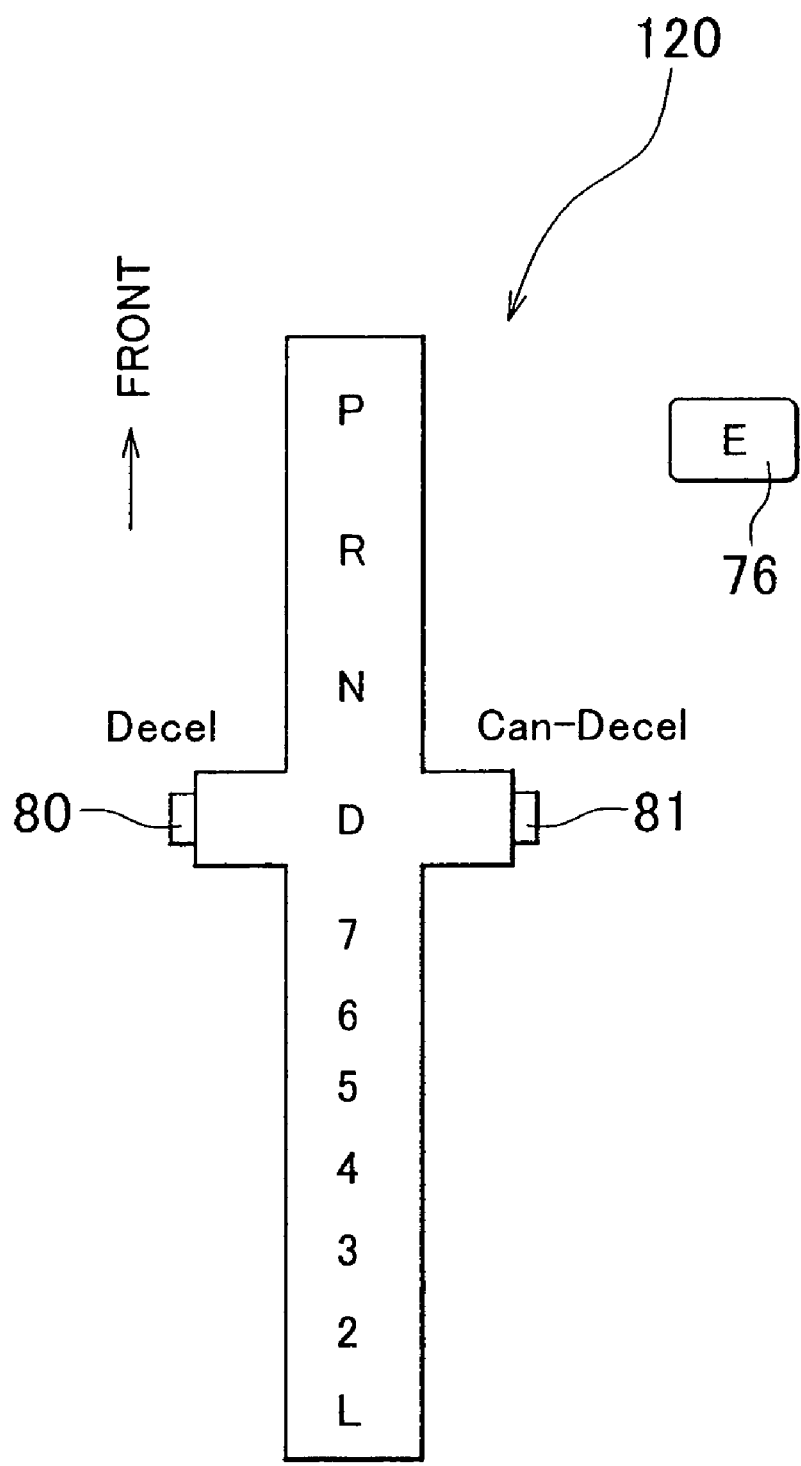
FIG. 6 is a view of an example of a shift pattern of a shift lever shown in FIG. 3.

Further, shift control of the automatic transmission 10 by the electronic control unit 90 is performed in accordance with the operating position PSH of the shift lever 72. The shift lever 72 is arranged near the left side (on a center console portion) of the driver's seat and can be shifted according to a shift pattern 120 shown in FIG. 6. In the shift pattern 120, operating positions "P (park)", "R (reverse)", "N (neutral)", "D (drive)", "7", "6", . . . "L" are arranged in the longitudinal direction of the vehicle. The "P" position is a parking position. When the shift lever 72 is shifted into this position, the transmission of power in the automatic transmission 10 is interrupted and the output shaft 24 becomes mechanically fixed, i.e., the driven wheels are unable to rotate, by a parking brake mechanism or the like which is activated in response to the shift, for example. The "R" position is a reverse running position that enables the vehicle to run in reverse. When the shift lever 72 is shifted into this position, the automatic transmission 10 establishes the reverse speed "Rev1" or "Rev2" by a manual valve of a hydraulic pressure control circuit 98 (see FIG. 3) being mechanically switched in response to the shift, for example. The "N" position is a position in which the power transmission path is interrupted. When the shift lever 72 is shifted into this position, all of the clutches C1 to C4 and brakes B1 and B2 in the automatic transmission 10 are released by, for example, a manual valve being switched mechanically in response to the shift, resulting in the automatic transmission 10 being placed in a state in which the transmission of power is interrupted.

Figure 8:
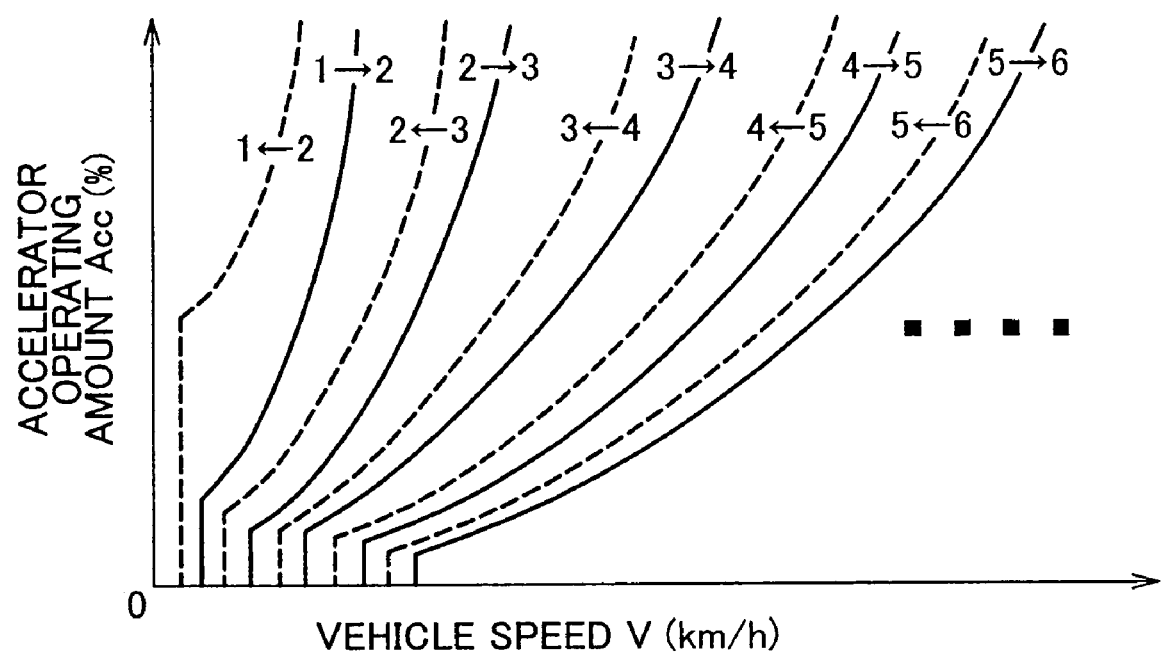
FIG. 8 is a view of an example of a shift map for automatically switching forward speeds in the automatic transmission shown in FIG. 1.

The "D" position is a forward running position that establishes a forward running mode which enables the vehicle to run in the forward direction while automatically switching forward speeds in the automatic transmission 10. When the shift lever 72 is shifted into this position, any one of the eight forward speeds "1st" to "8th" can be achieved by a valve being switched mechanically in response to the shift, for example, such that an upper D range (i.e., full range automatic shift mode) is established which shifts automatically using all of those forward speeds "1st" to "8th". That is, when the shift lever 72 is shifted into the "D" position and that shift is determined by a signal from the shift lever position sensor 74, the D range is electrically established and shift control is performed using all of the forward speeds from the first forward speed "1st" to the eighth forward speed "8th". More specifically, a hydraulic pressure circuit is switched by energizing or de-energizing an AT solenoid 99 of a plurality of solenoid valves and linear solenoid valves provided in the hydraulic pressure control circuit 98. As shown in FIG. 1B, any of the forward speeds, from the first forward speed "1st" to the eighth forward speed "8th", can be established by changing the operating state of the clutches C1 to C4 and the brakes B1 and B2. This shift control is performed according to a shift condition such as a shift map, which is stored beforehand, in which the vehicle speed V and the accelerator operating amount Acc are used as the parameters, as shown in FIG. 8.

Figure 9:
FIG. 9 is a chart showing the shift ranges and the width of each range in the automatic transmission shown in FIG. 1.

Positions "7" to "L" are lower range running positions which manually switch a plurality of preset shift ranges. The various shift ranges 7, 6, . . . L shown in FIG. 9 are established in response to the shift lever 72 being shifted into the corresponding running positions "7", "6", . . . "L". FIG. 9 shows the shift ranges and width of each range, with the numbers "1" to "8" in the speed column indicating the first forward speed "1st" to the eighth forward speed "8th", respectively. The lowest forward speed having the largest speed ratio is always the first forward speed "1st", and each shift range increases by one speed all the way up to the highest forward speed. Also, in each shift range, shifts are performed automatically according to the same shift condition as the D range from the first forward speed "1st" to the highest forward speed in that particular shift range. Therefore, when the shift lever 72 is successively shifted from the "D" position into the "7" position, "6" position, "5" position, and so on, on a downward slope, for example, the shift range changes from D to 7→6→5→ . . . and so on to perform successive downshifts from the eighth forward speed "8th" into the seventh forward speed "7th", the sixth forward speed "6th", the fifth forward speed "5th", . . . and so on.

On the left and right sides of the "D" position are a "Decel" position for increasing the target deceleration in the deceleration control mode and a "Can-Decel" position for decreasing the target deceleration, respectively. When the shift lever 72 is shifted into either the "Decel" position or the "Can-Decel" position, that shift is detected by the first Decel switch 80 or the first Can-Decel switch 81, and a deceleration command signal indicative of a first Decel command Decel1 or a first Can-Decel command Can-Decel1 is output to the electronic control unit 90. In response to that signal, the target deceleration in the deceleration control mode which controls the deceleration by power source braking changes. When increased deceleration is desired, i.e., when sudden braking is desired, all the driver must do is shift the shift lever 72 to the left (i.e., the side on which the "Decel" position is located), that is, the side away from the driver's seat. When a reduction in deceleration is desired, i.e., when a smooth deceleration is desired, on the other hand, all the driver must do is shift the shift lever 72 to the right (i.e., the side on which the "Can-Decel" position is located), that is, the side closer to the driver's seat.

The shift lever 72 does not slide continuously to the left and right, but rather moves with a restrained feeling. That is, the shift lever 72 is always in one of three positions: a center position, a position to the left, or a position to the right. Unless the driver is applying force to the shift lever 72, the shift lever 72 will immediately return to the center position, i.e., will return to the "D" position, by urging means such as a spring. The first Decel switch 80 and the first Can-Decel switch 81 are automatically turned off by urging means such as a spring. The D contact point is on even when the shift lever 72 is in the "Decel" position or the "Can-Decel" position, so the shift lever position sensor 74 recognizes these positions as the "D" position. Also, the "Decel" position and the "Can-Decel" position can also be left-right reversed as appropriate, i.e., the "Decel" position can be on the right side and the "Can-Decel" position can be on the left side, opposite from the example shown in FIG. 6.

The E-mode select switch 76 is provided near the shift lever 72. When the E-mode select switch 76 is turned on while the shift lever 72 is in the "D" position, the mode switches from the forward running mode to the deceleration control mode. At this time, the power source brake is controlled in accordance with the target deceleration by deceleration control mode executing means 110 shown in FIG. 4, which is a functional portion of the electronic control unit 90, and the ON operation of the first Decel switch 80 or the second Can-Decel switch 81 by the shift lever 72 goes into effect such that the target deceleration is increased or decreased.

Figure 7:
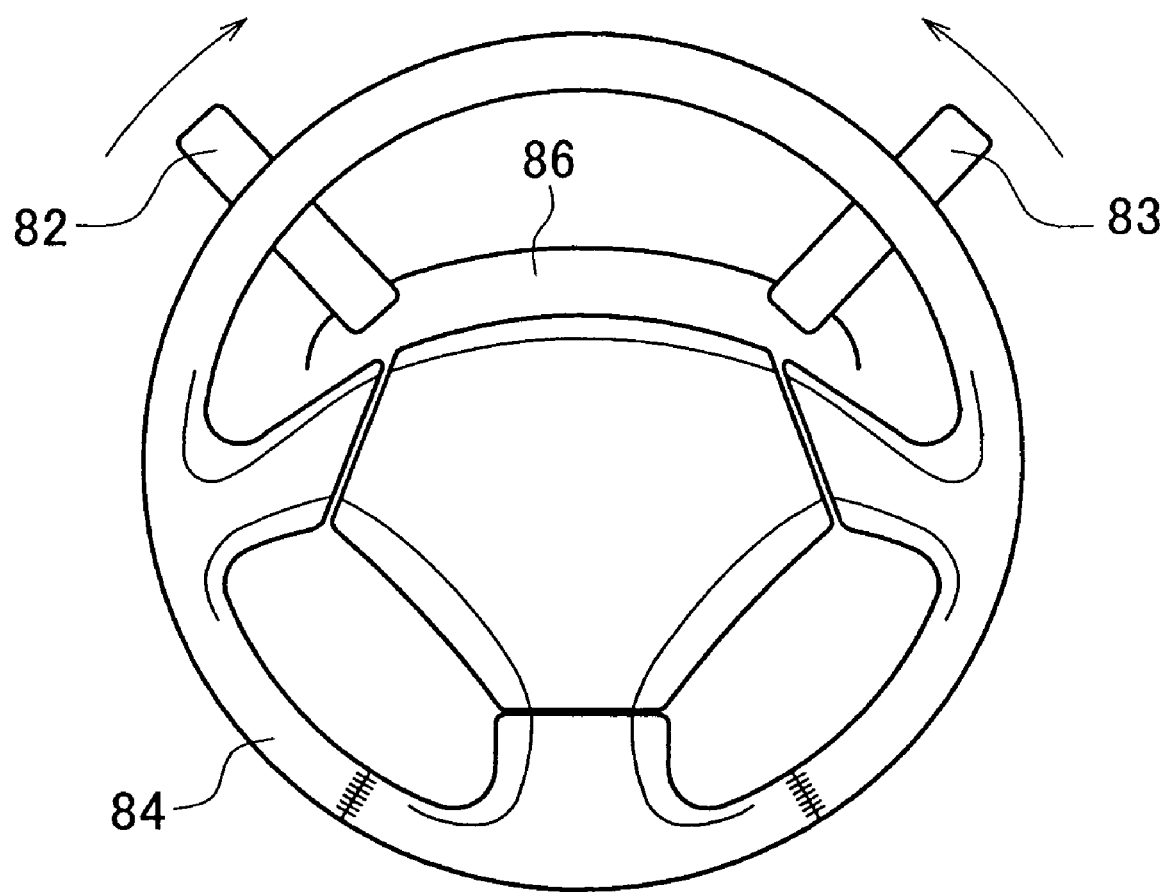
FIG. 7 is a view of an example of a second Decel switch and a second Can-Decel switch disposed on a steering column.

In the deceleration control mode, in addition to the operation of the shift lever 72 described above, the target deceleration can also be increased or decreased by turning (i.e., an ON operation) the second Decel switch 82 or the second Can-Decel switch 83, which are provided on the steering column 86 near the steering wheel 84, as shown in FIG. 7, in the directions shown by the arrows. That is, when the second Decel switch 82 or the second Can-Decel switch 83 is turned on, a deceleration command signal indicative of a second Decel command Decel2 or a second Can-Decel command Can-Decel2 is output from the second Decel switch 82 or the second Can-Decel switch 83 to the electronic control unit 90 and the target deceleration is increased or decreased accordingly. Further, when the second Decel switch 82 is turned on when in a forward running mode in which the E-mode select switch 76 is off and the shift lever 72 has been shifted into the "D" position, the mode switches from the forward mode to the deceleration control mode and deceleration control is performed with the power source brake by the deceleration control mode executing means 110. The second Decel switch 82 and the second Can-Decel switch 83 both have an automatic return function, such that after being turned on by the driver, they automatically return to their original positions (i.e., off) by urging means such as a spring. Also, because the second Decel switch 82 and the second Can-Decel switch 83 are both provided on the steering column 86 which is fixed in position, the driver can easily operate them even while turning the steering wheel 84.

When the deceleration control mode is set, an E-mode indicator 88 (see FIG. 3), which is provided on, for example, an instrument panel in front the driver, lights up, thereby indicating to the driver that the vehicle is in the deceleration control mode. Also, the amount of the target deceleration that is set to be gradually increased or decreased can be displayed either by graphic display or numerical display or the like on a set deceleration indicator 89 provided in the same way on the instrument panel by the shift lever 72 being shifted into the "Decel" position or the "Can-Decel" position, or by the second Decel switch 82 or the second Can-Decel switch 83 located on the steering column 86 being turned on, and the target deceleration can also be increased or decreased with reference to that display.

Figure 4:
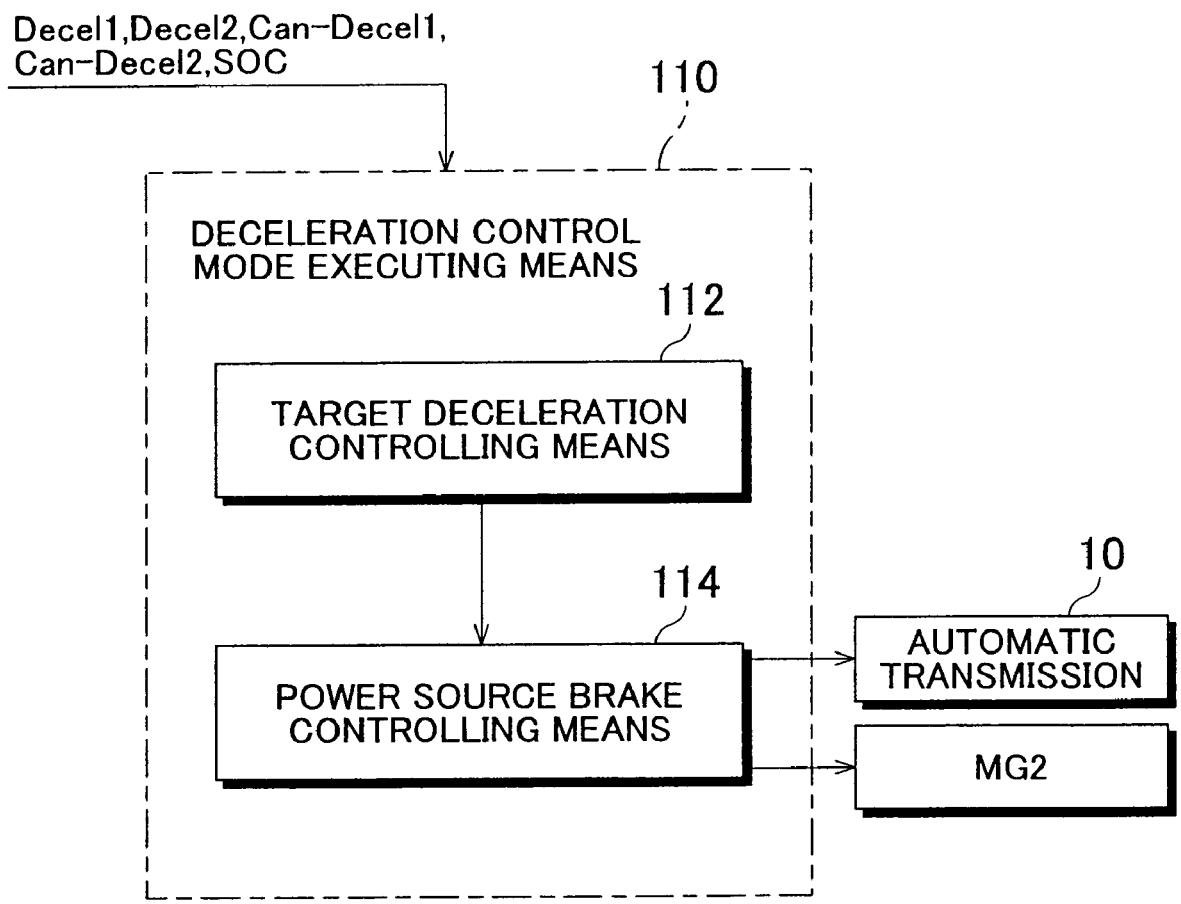
FIG. 4 is a block line graph illustrating the functions of an electronic control unit shown in FIG. 3 with respect to deceleration control.
Figure 10:
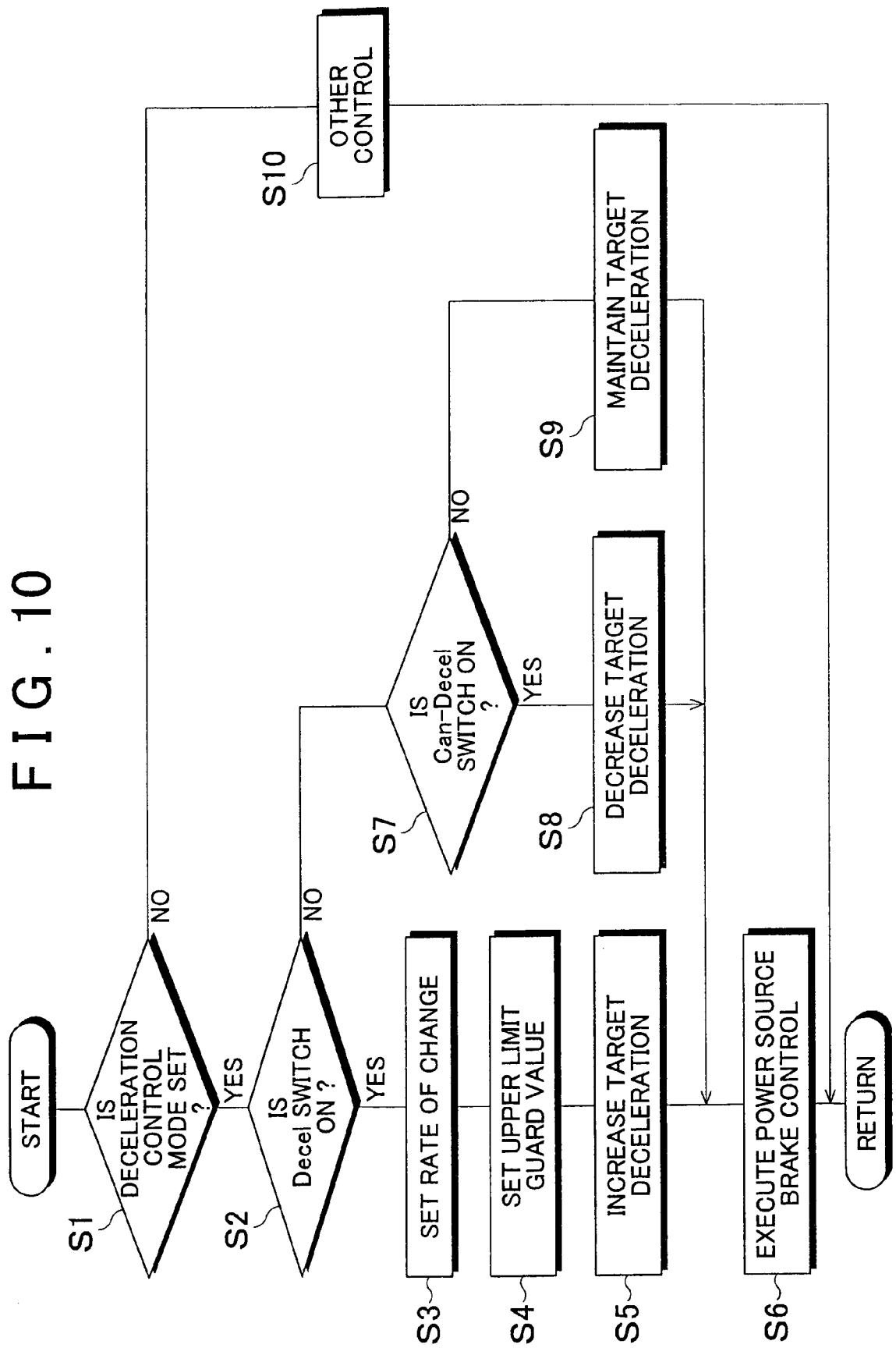
FIG. 10 is a flowchart illustrating in detail a deceleration control performed by deceleration control mode executing means shown in FIG. 4.
Figure 11:
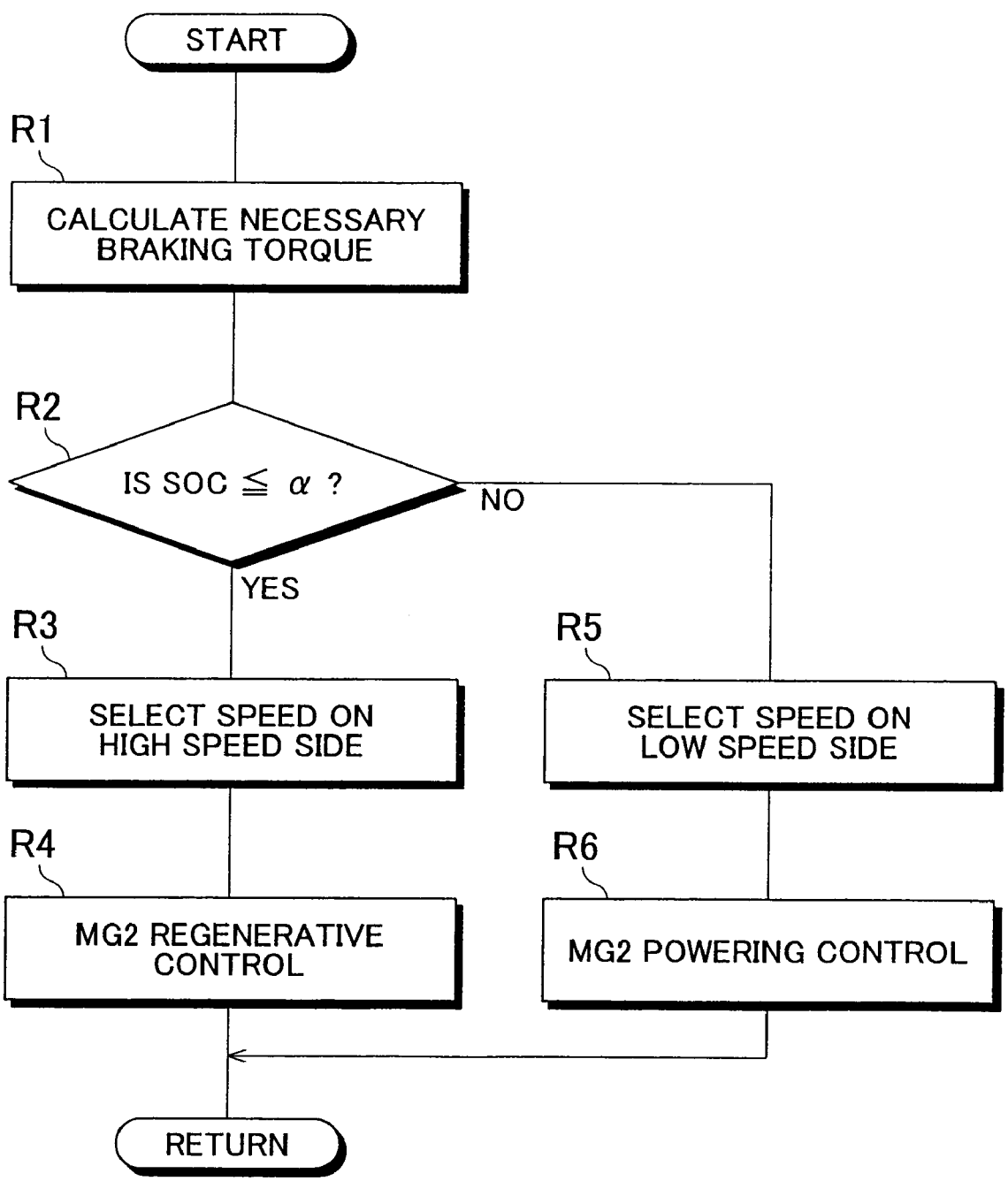
FIG. 11 is a flowchart illustrating the details of the processing of step S6 of the routine shown in FIG. 10.
Figure 17:
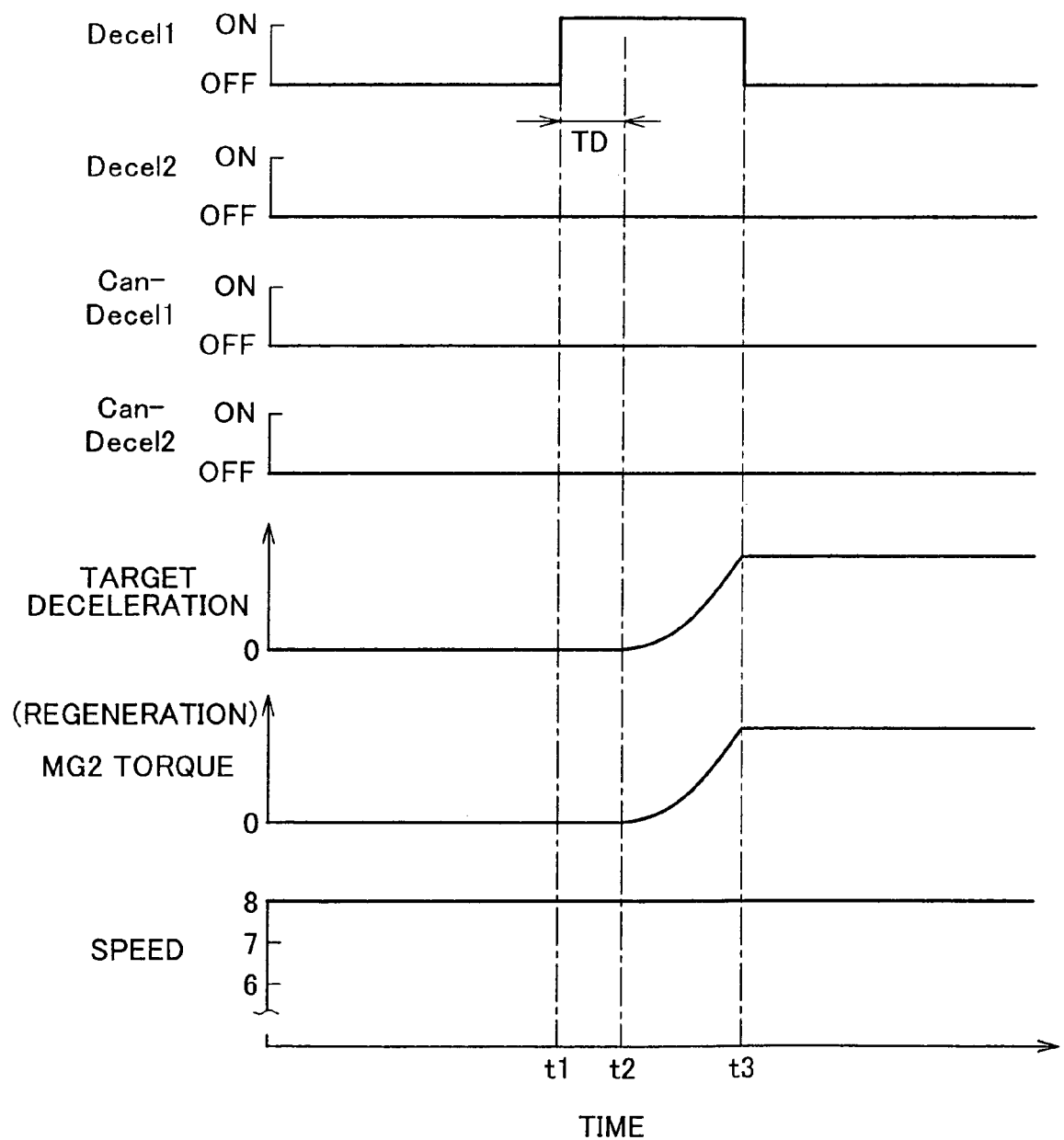
FIG. 17 is an example of a time chart in a case where the target deceleration is being increased in accordance with the flowchart shown in FIGS. 10 and 11, in which the vehicle speed is slow.
Figure 18:
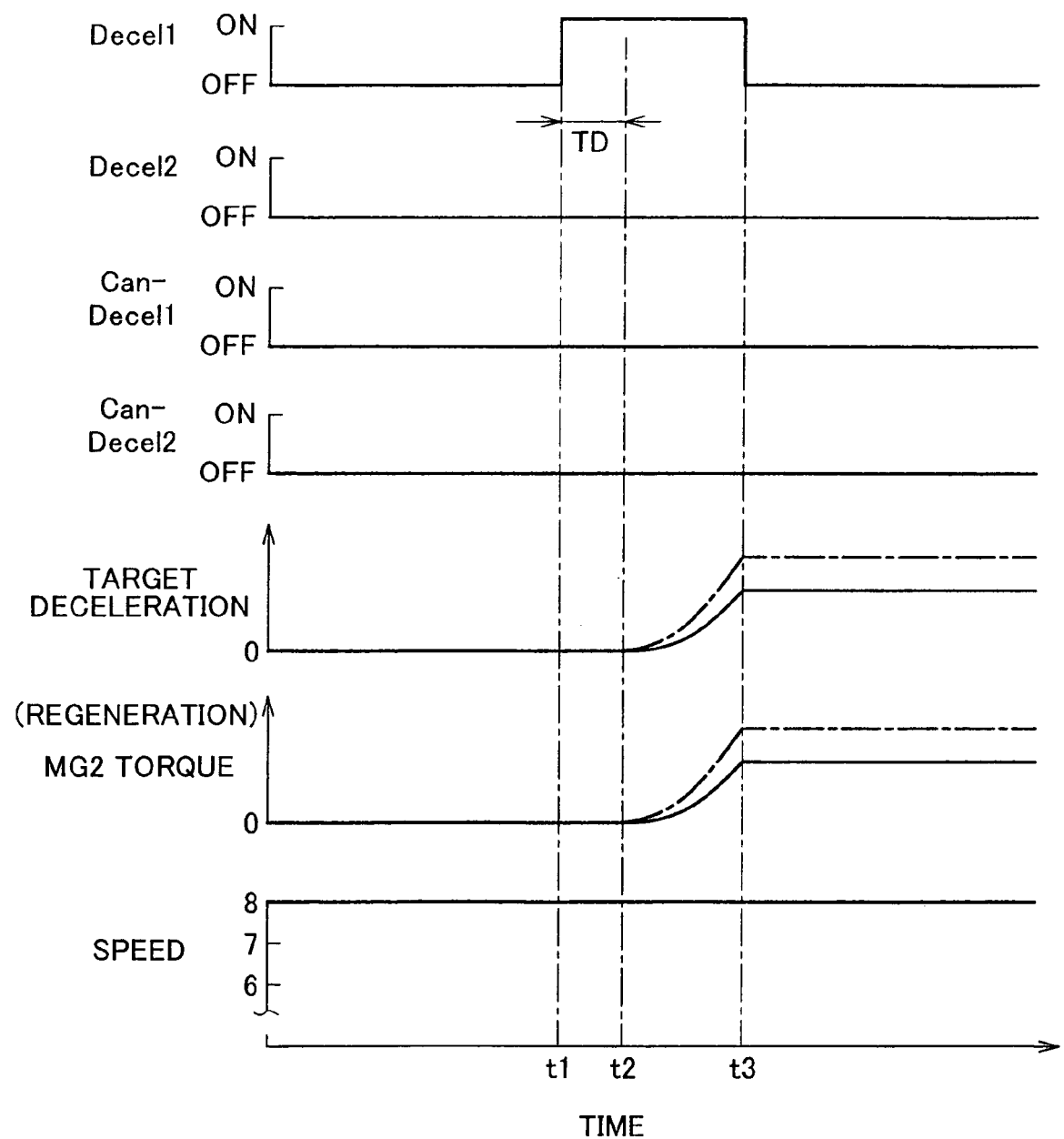
FIG. 18 is an example of a time chart in a case where the target deceleration is increased in accordance with the flowcharts shown in FIGS. 10 and 11, the example showing a comparison between a case where the vehicle speed is fast (solid line) and a case where the vehicle speed is slow (alternate long and short dash line)
Figure 19:
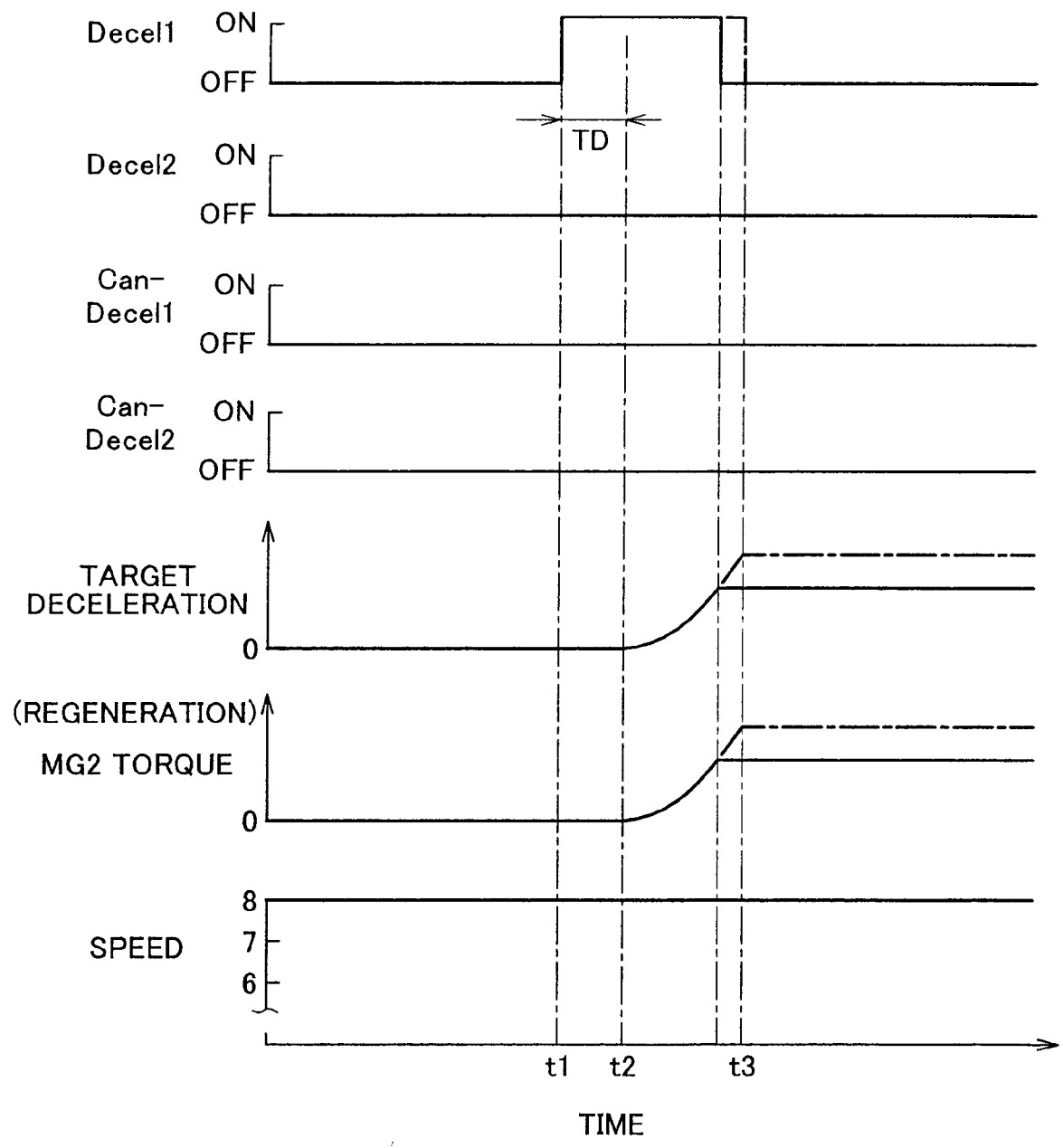
FIG. 19 is an example of a time chart in a case where the target deceleration is increased in accordance with the flowcharts shown in FIGS. 10 and 11, the example showing a comparison between cases in which the duration (i.e., hold duration) of a Decel1 signal differs.

The deceleration control according to the deceleration control mode is executed by the deceleration control mode executing means 110 shown in FIG. 4, and controls the power source brake in response to the first Decel command Decel1 or the first Can-Decel command Can-Decel1, which are output in response to the shift lever 72 being shifted into the "Decel" position or the "Can-Decel" position, or in response to the second Decel command Decel2 or the second Can-Decel command Can-Decel2, which are output in response to an operation of the second Decel switch 82 or the second Can-Decel switch 83 provided on the steering column 86. The deceleration control mode executing means 110 includes target deceleration controlling means 112 and power source brake controlling means 114, and performs signal processing according to the flowcharts shown in FIGS. 10 and 11. Steps S2 to S5 and S7 to S9 in FIG. 10 are executed by the target deceleration controlling means 112. Among those, step S3 serves as rate of change setting means which variably sets the rate of change in the target deceleration, while step S4 serves as upper limit guard value setting means which variably sets the upper limit guard value of the target deceleration. Further, step S6 is executed by the power source brake controlling means 114. FIG. 11 is a flowchart showing the processing of step S6 in more detail. FIGS. 17 to 19 are examples of time charts when deceleration control is performed according to the flowchart in FIG. 11.

The routine in the flowchart shown in FIG. 10 is repeatedly executed at predetermined time cycles when the shift lever 72 is maintained in the "D" position, including the "Decel" position and the "Can-Decel" position. In step S1 in this routine, it is determined whether the deceleration control mode is set. The deceleration control mode is set by turning on the E-mode select switch 76. It may also be determined that the deceleration control mode is selected, however, when the second Decel switch 82 on the steering column 86 is on, even if the E-mode select switch 76 is off, so the mode can be switched to the deceleration control mode by a simple operation. When the second Decel switch 82 is turned on, it is determined that the deceleration control mode has been selected only when it has been turned on for a duration longer than a delay time TD (see FIGS. 17 to 19) for determining whether the second Decel switch 82 was turned on in step S5 during execution of the deceleration control mode, in order to prevent the deceleration control mode from being set by an accidental operation.

Whether the deceleration control mode is set can be determined, for example, by a flag indicating that the deceleration control mode is being executed. If the deceleration control mode is set, steps S2 and thereafter are executed. If the deceleration control mode is not set, however, other control is performed at step S10 and this cycle of the routine ends. In step S2, it is determined whether the Decel switch 80 or 82 is on, i.e., whether the shift lever 72 has been shifted into the "Decel" position and the first Decel command Decel1 has been output, or whether the second Decel switch 82 provided on the steering column 86 has been turned on and the second Decel command Decel2 has been output. If either of the Decel switches 80 and 82 are on, steps S3 and thereafter are executed. If both of the Decel switches 80 and 82 are off, on the other hand, steps S7 and thereafter are executed.

Figure 12:
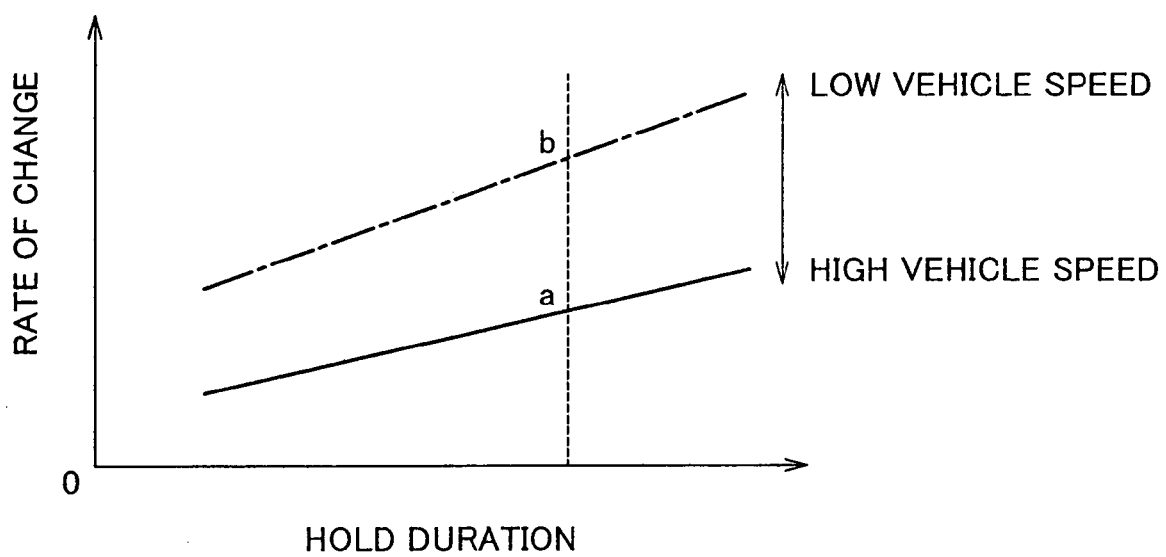
FIG. 12 is one example of a data map when a rate of change in a target deceleration is set in step S3 of the routine shown in FIG. 10.

In step S3, the rate of change in the target deceleration is variably set according to, for example, an operational expression and a preset data map, as shown in FIG. 12, based on the vehicle speed V and the duration of the Decel command Decel1 or Decel2, i.e., the hold duration (i.e., the duration of the operation) for which the shift lever 72 is held in the "Decel" position or for which the second Decel switch 82 is turned on. More specifically, the rate of change becomes continuously faster the longer the hold duration, while the rate of change becomes faster either continuously or in a stepped fashion the slower the vehicle speed V so that it is possible to quickly change to a large target deceleration. Also, in step S4, the upper limit guard value of the target deceleration is variably set according to an operational expression and a preset data map as shown by the broken lines in FIG. 13, for example, based on the vehicle speed V and the steering angle $\phi$. More specifically, the upper limit guard value becomes continuously lower the slower the vehicle speed V, and also becomes lower either continuously or in a stepped fashion the greater the steering angle $\phi$ so as to prevent sudden deceleration due to a large deceleration.

Figure 13:
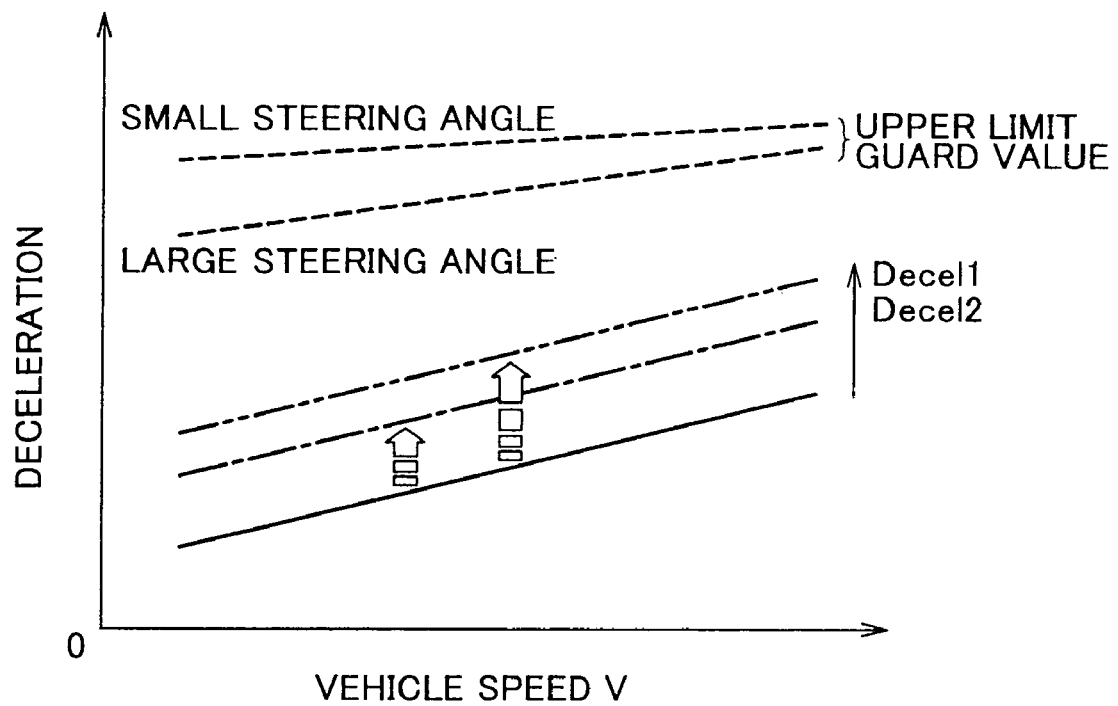
FIG. 13 is graph showing both the target deceleration which is set to increase in step S5 of the routine shown in FIG. 10, and an upper limit guard value that is set in step S4 of the routine shown in FIG. 10.

Then in step S5, the target deceleration is set to increase within the limits established by the upper limit guard value set in step S4, based on the hold duration for which the shift lever 72 is held in the "Decel" position or the second Decel switch 82 is turn on, and the rate of change set in step S3. In this exemplary embodiment, the first time this operation is performed, the change in the target deceleration is small but gradually increases as the hold duration becomes longer. As a result, the target deceleration can be changed a little at a time by stopping the ON operation after a short period of time, thereby making it easy to set the desired target deceleration. On the other hand, a long hold duration enables the target deceleration to be increased quickly. The solid line in FIG. 13 represents the initial deceleration when a series of increase operations is started, i.e., the target deceleration when the determination in step S2 is initially yes (positive). The alternate long and short dash line represents the target deceleration after three seconds, for example, and the double-dashed line represents the target deceleration after four seconds. The increase width per unit time increases the longer the hold duration.

Figure 14:
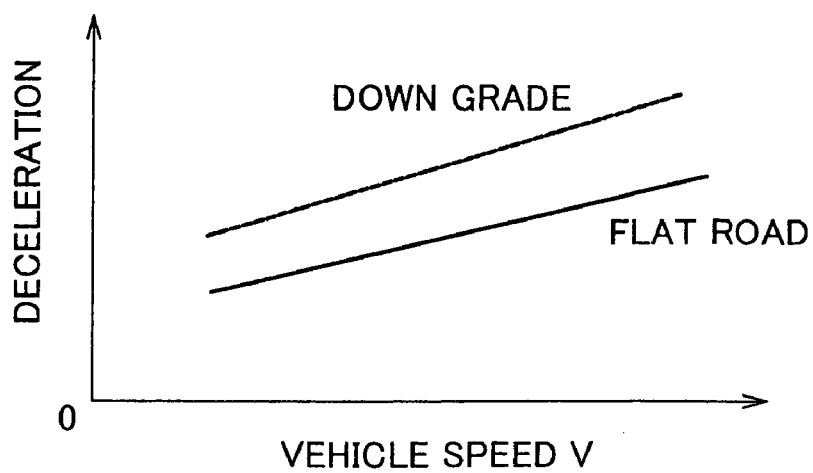
FIG. 14 is a graph showing a reference value when the target deceleration is set at the start of deceleration control.

Here, the reference value when the E-mode select switch 76 is turned on, the Decel command Decel1 or Decel2 is output, and the target deceleration is first set is determined using, for example, the vehicle speed V as a parameter, as shown by the solid line in FIG. 14. This reference value is a deceleration when only the engine brake during a fuel cut is applied while the vehicle is coasting with the accelerator off when automatic shift control according to the D range, i.e., the full range automatic shift mode, is being executed, and becomes larger the faster the vehicle speed V. Strictly speaking, with deceleration when the accelerator is off in the D range, there can be some roughness where the speeds switch, but the reference value is set to smooth out that roughness. The target deceleration is increased in response to the hold duration with that reference value set at 0. It is also possible to take the road gradient R into account, as shown by the broken line in FIG. 14, such that with a down grade, the target deceleration may be set based on a reference value that is larger than a reference value for a horizontal flat road. The target deceleration being equal to 0 in the time charts in FIGS. 17 to 19 refers to this reference value.

Then step S6 is executed and the power source brake is controlled to decelerate the vehicle according to the target deceleration. Time t1 in FIGS. 17 to 19 is the time when the shift lever 72 is shifted into the "Decel" position and deceleration control starts after the E-mode switch 76 has been turned on and the deceleration control mode has been set. In this case, the target deceleration is increased in step S5 after the preset delay time TD has passed, and regenerative torque control is performed in the second electric motor MG2 in step S6 according to that target deceleration. The delay time TD is an operation confirmation time provided in order to prevent the target deceleration from being changed by an accidental operation. Time t3 is the time when the shift lever 72 is released from the "Decel" position and the target deceleration increase is stopped.

FIGS. 17 to 19 are time charts showing cases when the shift lever 72 is pushed into the "Decel" position and the target deceleration is increased. FIG. 17 and FIG. 19 are examples of when the vehicle speed is low and FIG. 18 is an example of when the vehicle speed is high. The alternate long and short dash lines in the target deceleration and MG2 torque rows in the graph show a case in which the vehicle speed is low (the same as FIG. 17) for comparison. When the vehicle speed is high (shown by the solid lines), the change in the target deceleration is suppressed and thus increases gradually. The final target deceleration in this case is low. That is, the rate of change differs depending on the vehicle speed V, even when the hold duration is the same, as with points a and b in FIG. 12, so the final target deceleration also differs. Also, the solid lines in FIG. 19 show a case in which the vehicle speed V is the same but the hold duration for which the shift lever 72 is held in the "Decel" position is short compared with FIG. 17. Compared with the case shown in FIG. 17 shown by the alternate long and short dash line, the trajectory of the change in the target deceleration is the same but the final target deceleration is lower by the amount that the hold duration is short.

If the determination in step S2 is no (negative), i.e., if both of the Decel switches 80 and 82 are off, then step S7 is executed, where it is determined whether the Can-Decel switch 81 or 83 is on, i.e., whether the shift lever 72 is in the "Can-Decel" position and the first Can-Decel command Can-Decel1 output, or whether the Can-Decel switch 83 provided on the steering column 86 is turned on and the second Can-Decel command Can-Decel2 output. If both the Can-Decel switches 81 and 83 are off, the current target deceleration is maintained in step S9, after which step S6 is executed and the current deceleration control is continued. If, on the other hand, one of the Can-Decel switches 81 and 83 is on, then step S8 is executed such that the target deceleration is reduced. In step S8, the target deceleration is reduced at a fixed rate of change in response to the hold duration, for example. Alternatively, however, the rate of change may change based on the vehicle speed V and the hold duration, and the target deceleration may be reduced at that rate of change, as in step S3 and step S5.

In this way, the target deceleration is increased or decreased by executing steps S2 and thereafter. In this exemplary embodiment, however, processing is done without discriminating between the first Decel command Decel1 and the first Can-Decel command Can-Decel1, which are output by the shift lever 72 being shifted into the "Decel" position or the "Can-Decel" position, and the second Decel command Decel2 and the second Can-Decel command Can-Decel2, which are output in response to an operation of the second Decel switch 82 or the second Can-Decel switch 83 provided on the steering column 86. Therefore, the target deceleration is set to continuously increase or decrease and the power source brake is controlled regardless of which operation was performed. As a result, even if the shift lever 72 and the second Decel switch 82 or the second Can-Decel switch 83 are operated together according to the driving conditions of the vehicle, for example, the target deceleration continues to be increased or decreased regardless of the fact that the operating means is different, which increases the convenience of the setting operation of the target deceleration. For example, the target deceleration can be continuously increased or decreased to appropriately control vehicle deceleration by adjusting the deceleration using the shift lever 72 when traveling straight ahead at high speeds, and using the second Decel switch 82 and the second Can-Decel switch 83 provided on the steering column 86 when turning the steering wheel while cornering.

Figure 15:
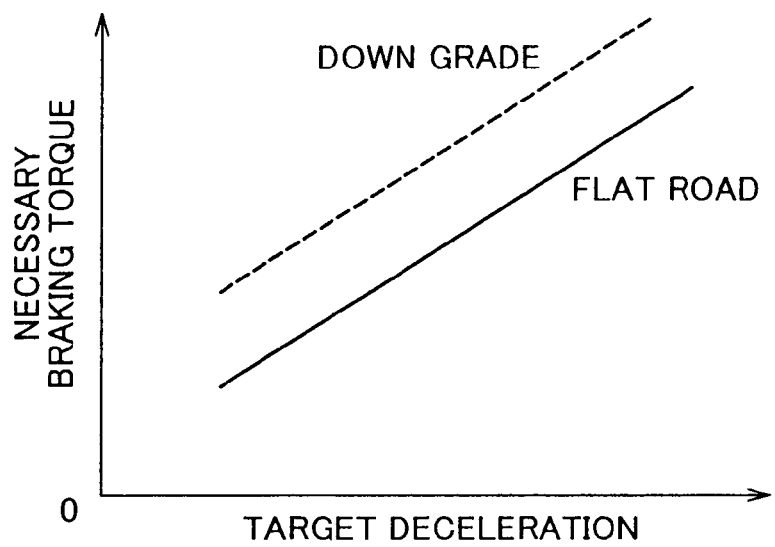
FIG. 15 is one example of a data map when obtaining a necessary braking torque from the target deceleration.

Next, the power source brake control in step S6 will be described in more detail with reference to the flowchart in FIG. 11. In step R1 in FIG. 11, the necessary braking torque is calculated according to the target deceleration set in step S5, step S8, or step S9. This is obtained according to an operational expression and a preset data map so that the necessary braking torque increases the greater the target deceleration, as shown by the solid line in FIG. 15, for example. In this case, when the reference value of the target deceleration is set without taking the road gradient R into account, as shown by the solid line in FIG. 14, a larger necessary braking torque may be calculated for a down grade than is calculated for a horizontal flat road by taking the road gradient R into consideration at this stage, as shown by the broken line in FIG. 15, for example. In addition, the necessary braking torque is preferably increased the greater the weight of the vehicle (the number of occupants, etc.). The necessary braking torque is set irrespective of whether the foot brake is being operated, as well as irrespective of the braking force of the foot brake if it is being operated. The power source brake does not change with a change in operation of the foot brake.

In step R2 it is determined whether the state-of-charge SOC of the battery 77 is equal to, or less than, a preset upper limit value $\alpha$. If SOC$\leq\alpha$, then the battery 77 can be charged so in step R3 a forward speed on the high speed side is set within the range in which the necessary braking torque can be generated, and in step R4 the second electric motor MG2 is controlled to regenerate electricity. As a result, the target braking torque can be obtained using both the engine braking force and regenerative torque. If, SOC>$\alpha$, on the other hand, the battery 77 can not be charged so in step R5 a forward speed on the low speed side is set within a range in which the necessary braking torque can be generated, and in step R6 the second electric motor MG2 is controlled to produce power. As a result, the target braking torque can be obtained by reducing the engine braking force with that powering torque.

Figure 16:
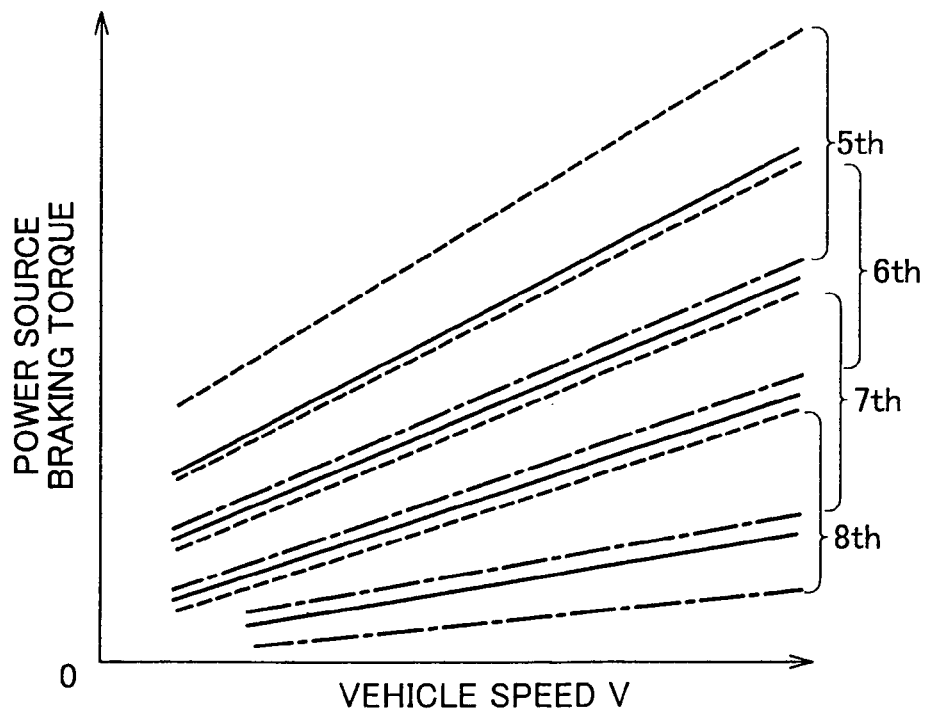
FIG. 16 is a graph showing a power source brake obtained according to vehicle speed by torque control of an electric motor and an engine brake.

That is, the power source braking torque is the sum of the engine braking torque obtained according to the speed of the automatic transmission 10 and the powering torque or regenerative torque of the second electric motor MG2. Therefore, when the second electric motor MG2 is controlled to regenerate electricity thereby generating torque to supplement the engine braking torque in each forward speed shown by the solid lines in FIG. 16, the power source braking torque can be increased within each of the ranges shown by the broken lines according to that regenerative torque. Also, when the second electric motor MG2 is controlled to produce power, the power source braking torque can be reduced to within the range indicated by the alternate long and short dash lines according to that powering torque. Thus, the ranges of the power source brake torque obtained in the various speeds overlap, as can be seen in FIG. 16. For example, the range of the power source braking torque obtained by controlling the second electric motor MG2 to regenerate electricity in the seventh forward speed "7th" overlaps with the range of the power source braking torque obtained by controlling the second electric motor MG2 to produce power in the sixth forward speed "6th". Therefore, basically, the second electric motor MG2 is controlled to regenerate electricity and charge the battery 77 while generating the target brake torque. When the battery 77 is full and can take no more charge, the automatic transmission 10 is shifted into a lower speed to increase the engine braking torque and the second electric motor MG2 is controlled to produce power to reduce the braking torque, thereby enabling the target braking torque to be obtained.

In this way, the predetermined braking force is generated by controlling the engine braking force by changing the speed of the automatic transmission 10 and controlling the second electric motor to either produce power or regenerate electricity. As a result, the deceleration is able to be controlled more precisely than it is when it is controlled using only the engine braking force generated by shift control of the automatic transmission 10.

When the first electric motor MG1 is also controlled to produce power or regenerate electricity in addition to the second electric motor MG2, the control range of the power source braking torque in each forward speed can be increased even further. As a result, power source brake control can also be performed by selecting the appropriate speed for the necessary braking torque from among three or more forward speeds. In the same way, the appropriate speed can be selected from among three or more forward speeds when the torque capacity of the second electric motor MG2 is large as well. Also, in steps R5 and R6, a forward speed on the low speed side is set while the second electric motor MG2 is controlled to produce power to reduce braking torque. Alternatively, however, the braking torque may also be increased by setting a forward speed on the high speed side and applying powering torque in the reverse rotational direction to the second electric motor MG2.

Also, if regenerative torque is unable to be obtained due to a failure in the electric motors MG1 and MG2, then braking torque is obtained by only the engine braking torque generated from shift control of the automatic transmission 10. Conversely, if engine braking force is unable to be obtained due to, for example, the vehicle speed being low and the clutch Ci being released, then braking torque is obtained by only regenerative control of the second electric motor MG2.

Also, if the accelerator pedal 50 is depressed while the deceleration control according to the deceleration control mode is being executed, then the deceleration control on the second electric motor MG2 is cancelled and the output of the engine and/or the second electric motor MG2 is controlled according to the accelerator operating amount Acc while the speed of the automatic transmission 10 is maintained. If the E-mode select switch 76 is turned off such that the deceleration control mode is cancelled, all control according to the deceleration control mode is also cancelled and the automatic transmission 10 establishes a predetermined forward speed according to a shift condition such as those shown in FIG. 8, while the engine 30 and the electric motors MG1 and MG2 are controlled according to the accelerator operating amount Acc. If the deceleration control mode is being executed while the E-mode select switch 76 is off, the deceleration control mode is cancelled by either the second Can-Decel switch 83 being turned on or the shift lever 72 being shifted into the "Can-Decel" position, as well as when the target deceleration has been reduced to the reference value (FIG. 14) at which deceleration control is not performed.

Here, in the deceleration control apparatus of this exemplary embodiment, the rate of change in the target deceleration is variably set in step S3 with the vehicle speed V and the hold duration as the parameters. Therefore, when the rate of change is slow, the desired target deceleration can be easily set and the target deceleration can be prevented from becoming too large. Meanwhile, when the rate of change is fast, even a relatively large target deceleration can be set quickly so highly responsive deceleration control can be performed. As a result, the operation for increasing or decreasing the target deceleration can be done both easily and appropriately.

That is, in this exemplary embodiment, when the driver shifts the shift lever 72 into the "Decel" position or turns on the second Decel switch 82 on the steering column 86, the target deceleration gradually increases according to the hold duration during that operation. However, because the rate of change increases the longer the hold duration, as shown in FIG. 12, the target deceleration can be quickly increased by the hold operation when the target deceleration is to be greatly changed, so responsiveness of the deceleration control is improved. Meanwhile, because the rate of change is slow when the hold duration is short, it is possible to easily set the desired target deceleration with high accuracy.

Also, the rate of change in the target deceleration is slower at high vehicle speeds than it is at low vehicle speeds. As a result, because the rate of change is slow at high running speeds, the desired target deceleration can be set easily, and sudden deceleration due to the target deceleration being set too large and a large braking force being suddenly applied can be prevented. On the other hand, the rate of change in the target deceleration is fast when the vehicle is running at slow speeds, which enables the target deceleration to be increased quickly to the desired target deceleration. As a result, highly responsive deceleration control is performed.

Also in this exemplary embodiment, the upper limit guard value is set in step S4 and the target deceleration is limited by that upper limit guard value. As a result, rapid deceleration due to a large braking force suddenly being generated because the target deceleration is set too large is able to be prevented even if the rate of change when the target deceleration is increased is fast. In addition, the operation to increase the target deceleration can be done easily and the increase operation when setting the target deceleration (upper limit guard value) as large as possible can be done quickly.

Further in this exemplary embodiment, the upper limit guard value is variably set with the vehicle speed V and the steering angle $\phi$ as the parameters, as shown by the broken lines in FIG. 13. Thus, deceleration control can be appropriately performed using the largest target deceleration possible, as determined according to the vehicle speed V and the steering angle $\phi$, without the target deceleration being limited any more than is necessary. More specifically, the upper limit guard value is reduced when the steering angle $\phi$ is large so as to prevent sudden deceleration due to a large braking force while traveling with a large steering angle $\phi$, and making it easier to perform an operation to increase the target deceleration during cornering.

Next, another exemplary embodiment of the invention will be described. Portions in the following exemplary embodiment that are substantially the same as portions in the foregoing exemplary embodiment will be denoted by like reference characters and descriptions thereof will be omitted.

Figure 21:
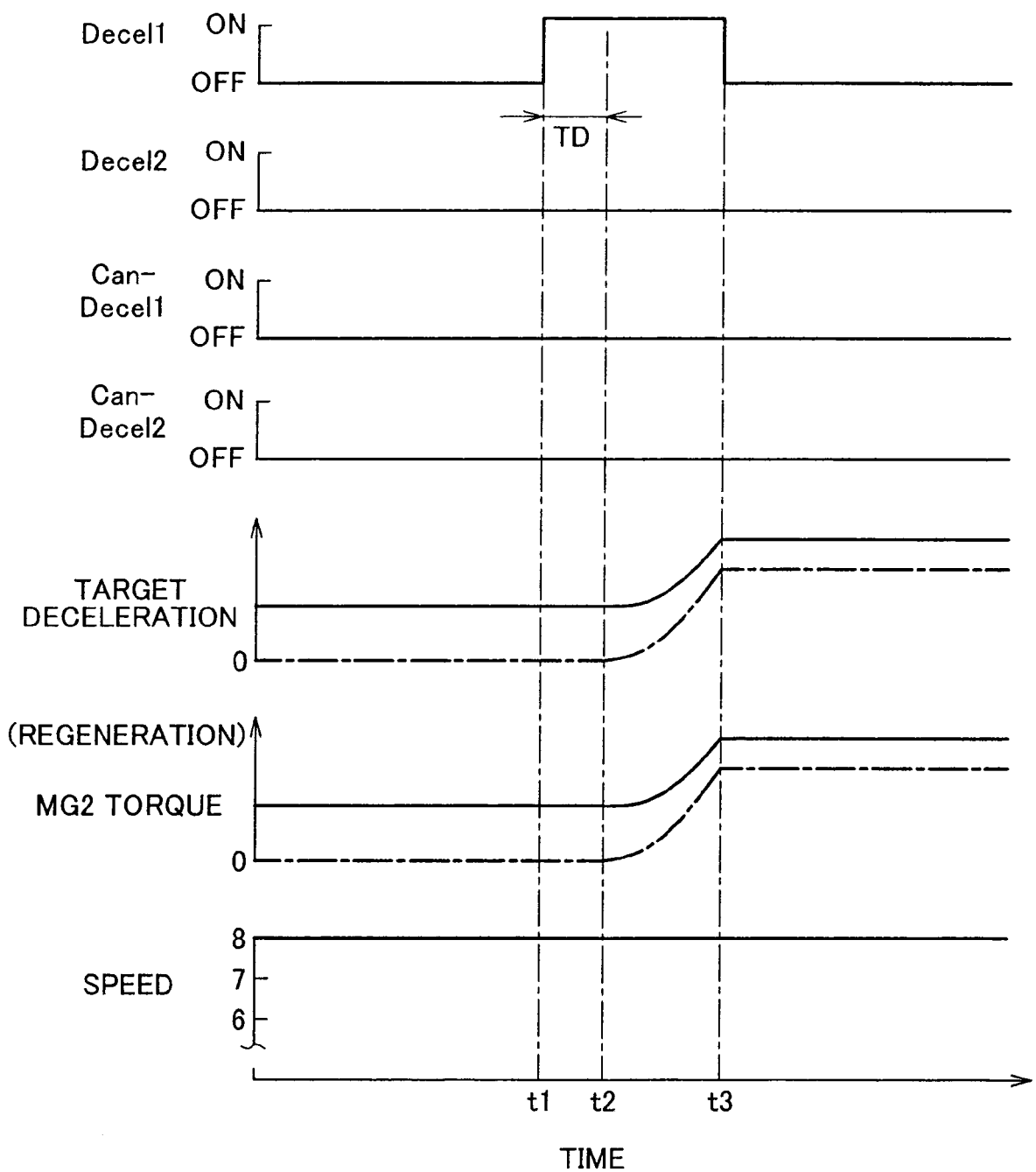
FIG. 21 is an example of a time chart showing a case in which the rate of change in the target deceleration has been changed by the initial deceleration.

In the foregoing exemplary embodiment, the rate of change in the target deceleration is changed with the vehicle speed V and the hold duration as parameters. Alternatively, however, the rate of change may also be changed with the initial deceleration (i.e., the target deceleration when the determination in step S2 was initially yes (positive) at the start of a series of increase operations), the road gradient R, and the steering angle $\phi$ as parameters, as shown in FIGS. 20A to 20C. FIG. 20A shows a case in which the rate of change is reduced continuously or in a stepped fashion when the initial deceleration is large as compared to when it is small. When the initial deceleration is small, the target deceleration can be changed quickly to a large target deceleration so highly responsive deceleration control can be performed. When the initial deceleration is large, the rate of change is slow so a desired target deceleration can be easily set while sudden deceleration due to excessive braking force caused by the target deceleration becoming too large can be prevented. The time chart shown in FIG. 21 shows a view comparing different initial decelerations, with the solid lines in the target deceleration and MG2 torque rows indicating a case in which the initial deceleration is large, and the alternate long and short dash lines in the same rows indicating a case in which the initial deceleration is 0, i.e., a reference value without deceleration control. When the initial deceleration is large, the increase in the target deceleration is suppressed so that it increases gradually.

FIG. 20B shows a case in which the rate of change is increased continuously or in a stepped fashion when the down grade is large as compared to when it is small. When the down grade is large, the target deceleration can be changed quickly to a large target deceleration so highly responsive deceleration control can be performed. When the down grade is small, such as on a flat road, the rate of change is slow so a desired target deceleration can be easily set. Although the change in the target deceleration in FIG. 18 is due to the difference in vehicle speed V, the target deceleration changes as shown by the solid line and the alternate long and short dash line in FIG. 18 also when the down grade is different. That is, when the down grade is large, the target deceleration changes at a fast rate of change as shown by the alternate long and short dash line. When the down grade is small, the target deceleration changes gradually as shown by the solid line.

FIG. 20C shows a case in which the rate of change is reduced continuously or in a stepped fashion when the steering angle $\phi$ is large as compared to when it is small. When the steering angle $\phi$ is small, the target deceleration can be changed quickly to a large target deceleration so highly responsive deceleration control can be performed. When the steering angle $\phi$ is large, the rate of change is slow so a desired target deceleration can be easily set and sudden deceleration due to excessive braking force caused by the target deceleration becoming too large can be prevented. In this way, the target deceleration changes as shown by the solid line and the alternate long and short dash line in FIG. 18 also when the steering angle $\phi$ is different. That is, when the steering angle $\phi$ is small, the target deceleration changes at a fast rate of change as shown by the alternate long and short dash line. When the steering angle $\phi$ is large, the target deceleration changes gradually as shown by the solid line.

The rate of change in the target deceleration may also be determined taking into account only one, an appropriate plurality, or all of the vehicle speed V, the hold duration, the initial deceleration, the road gradient R, and the steering angle $\phi$. The rate of change in the target deceleration may also be set taking into account still another running state, for example, such as the state of the road.

Figure 22:
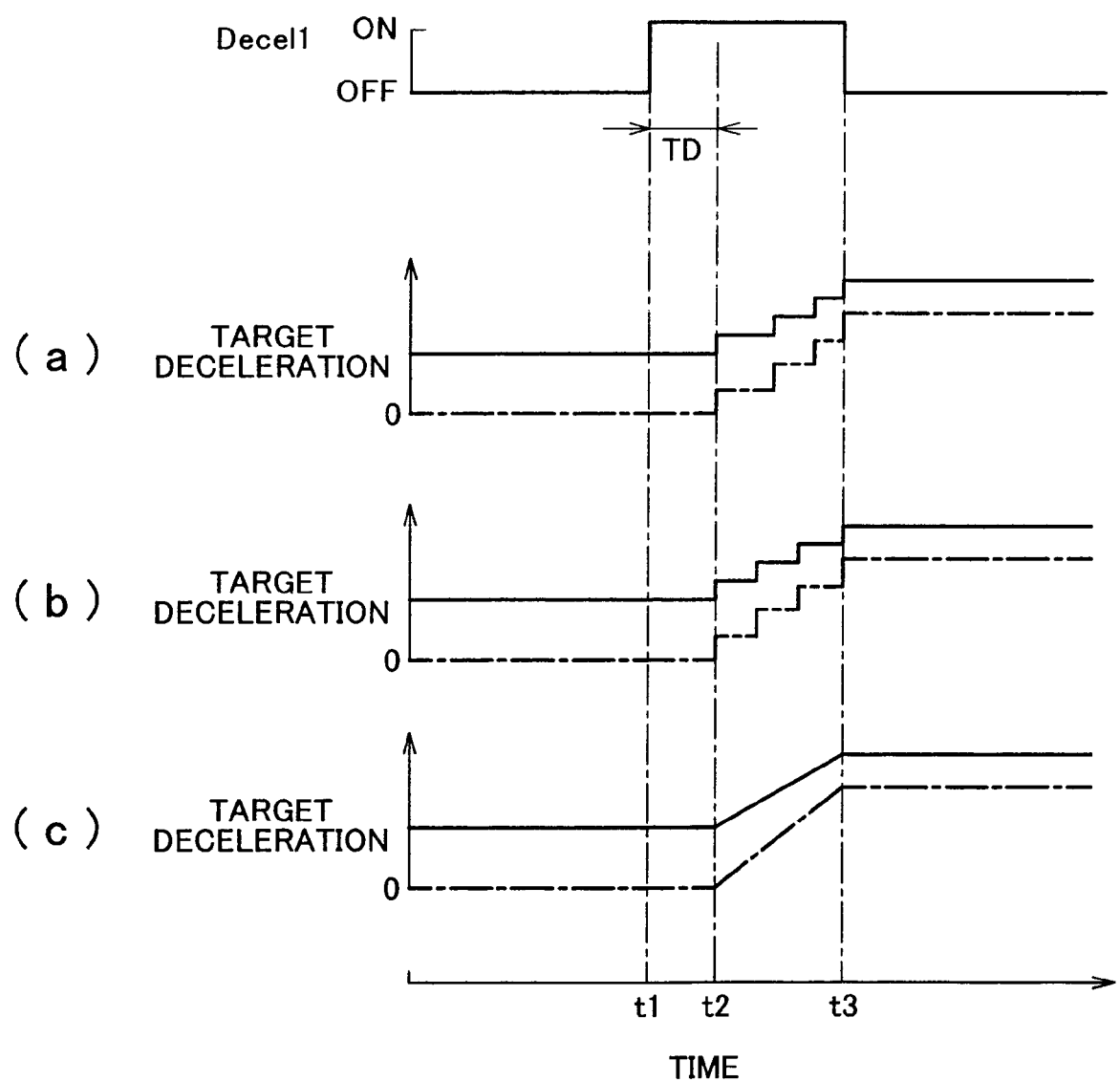
FIG. 22 is an example of a time chart of a case where the target deceleration is changed in a stepped fashion, and a case where the target deceleration is changed by a fixed rate of change regardless of the hold duration.

Also, in the foregoing exemplary embodiment, the target deceleration is continuously increased with respect to the hold duration, but it may also be increased in a stepped fashion, as is shown in section (a) of FIG. 22. Section (a) of FIG. 22 shows a case in which the rate of change becomes faster the longer the hold duration, just as in the foregoing exemplary embodiment. In this case, the time intervals at which the target deceleration changes become shorter the longer the hold duration. Alternatively, however, the change width may be gradually widened and the time intervals kept equal. Also, in the foregoing exemplary embodiment the rate of change is increased the longer the hold duration. Alternatively, however, the target deceleration may be changed at a fixed rate of change regardless of the hold duration, as shown in sections (b) and (c) of FIG. 22. Section (b) of FIG. 22 shows a case in which the target deceleration changes in a stepped fashion, and section (c) of FIG. 22 shows a case in which the target deceleration changes in a continuous, i.e., linear, fashion. Sections (a) to (c) are all time charts corresponding to FIG. 21, and are cases in which the rate of change in the target deceleration is changed by the initial target deceleration.

Figure 23:
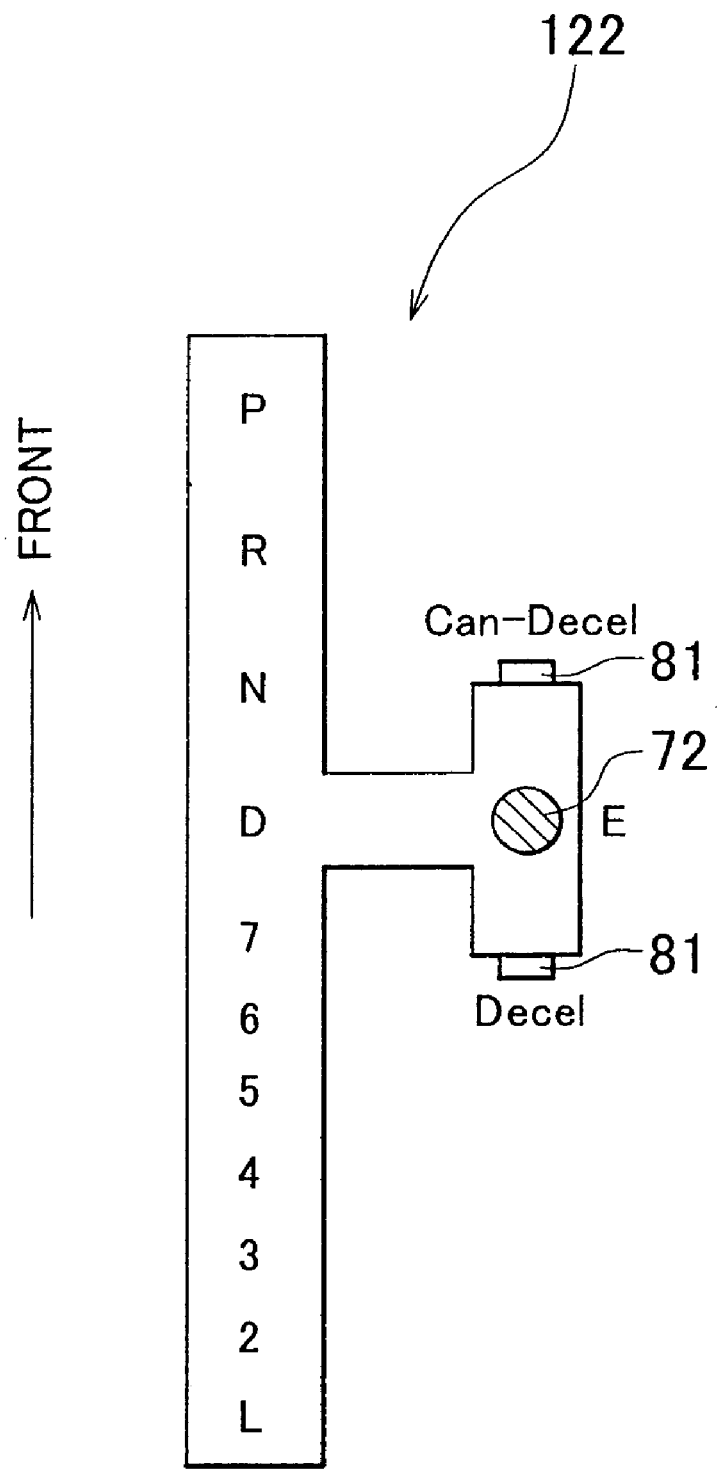
FIG. 23 is a view of another example of a shift pattern and deceleration control mode selecting means.

In addition, in the foregoing exemplary embodiment, the E-mode select switch 76 is provided separate from the shift pattern 120. Alternatively, however, a deceleration control mode select position "E" may also be provided as a position into which the shift lever 72 may be shifted, as shown in shift pattern 122 of FIG. 23. That is, a deceleration control mode select position "E" is provided right beside the "D" position and the E-mode select switch 76 is provided at that "E" position such that when the shift lever 72 is shifted into the "E" position, it can be detected that the deceleration control mode has been selected. Also, a "Can-Decel" position is provided in front of the "E" position and a "Decel" position is provided in back of the "E" position. Further, the first Can-Decel switch 81 is arranged at the "Can-Decel" position and the first Decel switch 80 is arranged at the "Decel" position. Thus, when the shift lever 72 is shifted into the "Can-Decel" position or the "Decel" position, the first Can-Decel command Can-Decel1 or the first Decel command Decel1 is output to the electronic control unit 90.

In the foregoing exemplary embodiments cases are described in which the target deceleration is increased and decreased manually. Alternatively, however, in a case in which the target deceleration is increased and decreased automatically by auto-cruise control, for example, an increase or decrease in the target deceleration can be set appropriately if the rate of change in that target deceleration is made to be set variably. For example, highly responsive deceleration control can be performed if the rate of change in the target deceleration is made to increase when the distance to a preceding vehicle becomes shorter.

Although the invention has been described herein with reference to specific embodiments, many modifications and variations therein will readily occur to those skilled in the art. Accordingly, all such variations and modifications are included within the intended scope of the invention.

What is claimed is:

1. A deceleration control apparatus for a vehicle, which includes target deceleration controlling means for increasing/decreasing a target deceleration and which controls a braking force in accordance with the target deceleration set by the target deceleration controlling means, wherein a rate of change in the target deceleration is variably set, wherein the target deceleration controlling means increases/decreases the target deceleration in response to an operation of a target deceleration setting portion by a driver, and the target deceleration gradually changes during operation of the target deceleration setting portion and the rate of change in the target deceleration becomes faster as the duration of the operation of the target deceleration setting portion becomes longer.

2. The deceleration control apparatus for a vehicle according to claim 1, wherein the rate of change in the target deceleration changes depending on a running state of the vehicle.

3. The deceleration control apparatus for a vehicle according to claim 2, wherein the running state of the vehicle includes at least one of initial deceleration when the target deceleration changes, vehicle speed, steering angle, and road gradient.

4. The deceleration control apparatus for a vehicle according to claim 1, wherein the target deceleration is limited by an upper limit guard value and the upper limit guard value is variably set.

5. The deceleration control apparatus for a vehicle according to claim 4, wherein the upper limit guard value changes depending on steering angle.

6. A deceleration control apparatus for a vehicle, comprising:
a power train including at least one power source for running the vehicle; and
a target deceleration controller for increasing/decreasing a target deceleration and which controls a braking force generated by the power train in accordance with the target deceleration set by the target deceleration controller, wherein the target deceleration is limited by an upper limit guard value and the upper limit guard value is variably set,
wherein the upper limit guard value changes depending on steering angle.

7. A deceleration control method for a vehicle, comprising:
setting a target deceleration;
controlling a braking force in accordance with the target deceleration; and
changing the target deceleration wherein a rate of change in the target deceleration is variably set,
wherein the change of the target deceleration is triggered by an operation of a driver; and
the variable setting of the rate of change in the target deceleration is performed based on the operation of the driver,
wherein the change of the target deceleration is such that the target deceleration gradually changes during the operation of the driver, and
the variable setting of the rate of change in the target deceleration is such that the rate of change in the target deceleration becomes faster as duration of the operation of the driver becomes longer.

8. The deceleration control method according to claim 7, wherein the variable setting of the rate of change in the target deceleration is performed based on a running state of the vehicle.

9. The deceleration control method according to claim 8, wherein the running state of the vehicle includes at least one of initial deceleration when the target deceleration changes, vehicle speed, steering angle, and road gradient.

10. The deceleration control method according to claim 7, wherein the target deceleration is limited by an upper limit guard value and the upper limit guard value is variably set.

11. The deceleration control method for according to claim 10, wherein the upper limit guard value changes depending on steering angle.

12. A deceleration control method for a vehicle, comprising:
setting an upper limit guard value; and
setting a target deceleration of a vehicle so as to be equal to, or less than, the upper limit guard value, wherein the upper limit guard value is variably set, and
wherein the upper limit guard value changes depending on steering angle.

13. A deceleration control apparatus for a vehicle, comprising:
a power train including at least one power source for running the vehicle;
a deceleration controller for setting a target deceleration of the vehicle and controlling at least a braking force generated by the power train so as to achieve the target deceleration, the deceleration controller being adapted to variably set a rate of change in the target deceleration; and
a target deceleration setting portion that is operated by a driver to adjust the target deceleration,
wherein the deceleration controller is adapted to change the rate of change in the target deceleration in accordance with the operation of the target deceleration setting portion by the driver,
wherein the deceleration controller is adapted to change the target deceleration gradually during operation of the target deceleration setting portion, and
wherein the deceleration controller is adapted to make the rate of change in the target deceleration faster as duration of the operation of the target deceleration setting portion becomes longer.

14. The deceleration control apparatus according to claim 13, further comprising:
a running state detector for detecting a running state of the vehicle, wherein the deceleration controller is adapted to change the rate of change in the target deceleration based on the running state of the vehicle detected by the running state detector.

15. The deceleration control apparatus according to claim 14, wherein the running state detector includes at least one of a vehicle speed detector for detecting vehicle speed, a steering angle detector for detecting steering angle, a road gradient detector for detecting road gradient, and an initial deceleration detector for detecting initial deceleration when the target deceleration changes.

16. The deceleration control apparatus according to claim 13, wherein the deceleration controller is adapted to limit the target deceleration by an upper limit guard and set the upper limit guard variably.

17. The deceleration control apparatus according to claim 16, further comprising:
a steering angle detector for detecting steering angle, wherein the deceleration controller is adapted to set the upper limit guard based on the steering angle detected by the steering angle detector.

18. The deceleration control apparatus according to claim 13, wherein the at least one power source includes a first power source that generate a first torque and a second power source that generates a second torque; and
the deceleration controller is adapted to obtain a sum of the first torque and the second torque and control the braking force according to the obtained sum.

19. The deceleration control apparatus according to claim 18, wherein the first power source includes an internal combustion engine and the first torque includes engine brake torque generated by the internal combustion engine; and the second power source includes a motor-generator that generates powering torque in a driving mode and generates regenerating torque in a regenerating mode, and the second torque includes at least one of the powering torque and the regenerating torque generated by the motor-generator.

* * * * *